US007773119B2

(12) United States Patent
Wada et al.

(10) Patent No.: US 7,773,119 B2
(45) Date of Patent: Aug. 10, 2010

(54) DRIVE APPARATUS, IMAGE PICKUP UNIT AND IMAGE PICKUP APPARATUS

(75) Inventors: Shigeru Wada, Kishiwada (JP); Yoshihiro Hara, Takatsuki (JP); Masamichi Oohara, Kadoma (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 596 days.

(21) Appl. No.: 11/788,262

(22) Filed: Apr. 19, 2007

(65) Prior Publication Data
US 2007/0279497 A1    Dec. 6, 2007

(30) Foreign Application Priority Data
Apr. 28, 2006  (JP) .............................. 2006-125356
May 30, 2006  (JP) .............................. 2006-149537

(51) Int. Cl.
*H04N 5/228* (2006.01)
(52) U.S. Cl. ............................... 348/208.99; 348/208.4; 348/208.7
(58) Field of Classification Search ............ 348/208.99, 348/208.4, 208.7, 208.11, 208.12
See application file for complete search history.

(56) References Cited
U.S. PATENT DOCUMENTS
7,486,881 B2 * 2/2009 Chou et al. ................... 396/55

| | | | |
|---|---|---|---|
| 7,539,404 B2 * | 5/2009 | Iwasaki et al. ................ 396/55 |
| 2003/0067544 A1 * | 4/2003 | Wada ....................... 348/208.7 |
| 2003/0076421 A1 * | 4/2003 | Dutta ..................... 348/208.11 |
| 2004/0012683 A1 * | 1/2004 | Yamasaki et al. ........ 348/208.1 |
| 2007/0024715 A1 * | 2/2007 | Hirasawa et al. ......... 348/208.7 |
| 2007/0236577 A1 * | 10/2007 | Ke et al. ................ 348/208.99 |
| 2009/0135260 A1 * | 5/2009 | Rouvinen et al. ...... 348/208.11 |

FOREIGN PATENT DOCUMENTS

| JP | 10-106013 A | 4/1998 |
|---|---|---|
| JP | 2001-194571 A | 7/2001 |
| JP | 2003-110919 A | 4/2003 |
| JP | 2003-204470 A | 7/2003 |
| JP | 2005-330457 A | 12/2005 |

* cited by examiner

*Primary Examiner*—James M Hannett
(74) *Attorney, Agent, or Firm*—Sidley Austin LLP

(57) ABSTRACT

A small-sized and highly efficient drive apparatus, an image pickup unit and an image pickup apparatus are provided, by using a polymer actuator that is small in size and has high speed of response and has high degree of freedom for arrangement, and by realizing an actuator having excellent assembly simplicity. By being provided with a polymer actuator and by moving objects to be driven such as an image pickup device, a lens, an image pickup optical system and a lens barrel unit by the use of the actuator, an actuator that is small in size and has the high speed of response, a high degree of freedom for arrangement and excellent assembly simplicity can be provided, which makes it possible to provide a small-sized and highly efficient drive apparatus, an image pickup unit and an image pickup apparatus.

23 Claims, 20 Drawing Sheets

FIG. 20 ( a )
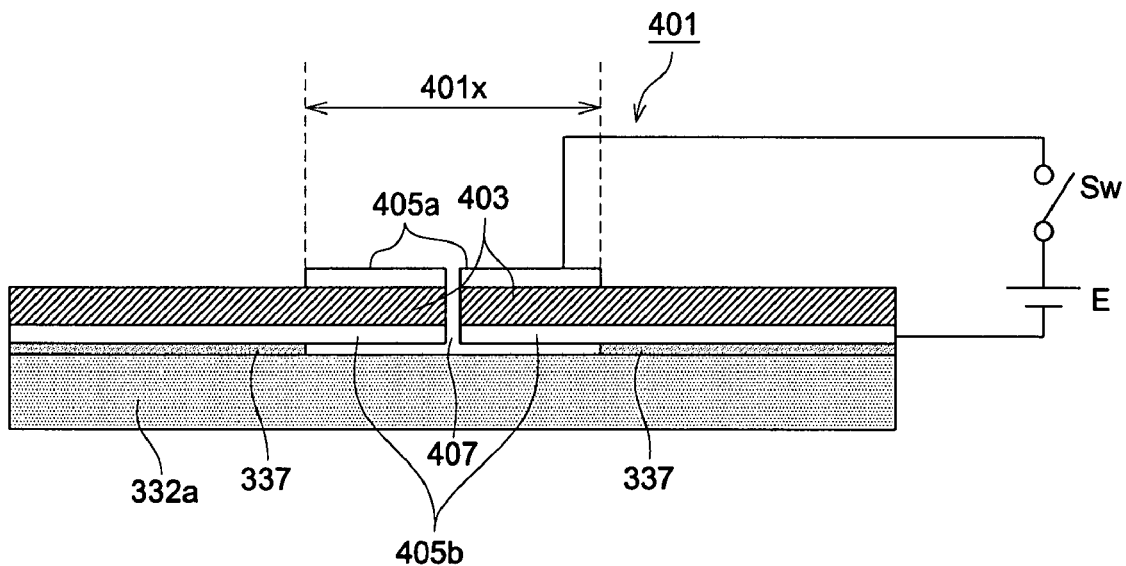
FIG. 20 ( b )
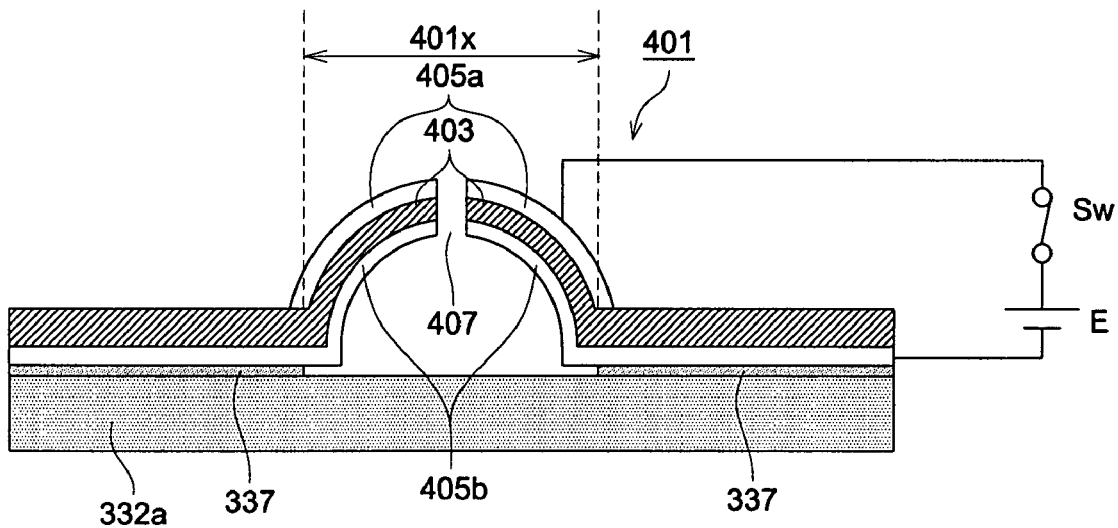

DRIVE APPARATUS, IMAGE PICKUP UNIT AND IMAGE PICKUP APPARATUS

This application is based on Japanese Patent Application No. 2006-125356 filed on Apr. 28, 2006, and No. 2006-149537 filed on May 30, 2006, in Japanese Patent Office, the entire content of which is hereby incorporated by reference.

TECHNICAL FIELD

The present invention relates to a drive apparatus, an image pickup unit and an image pickup apparatus, and in particular, to a drive apparatus, an image pickup unit and an image pickup apparatus which have therein a mechanism to conduct autofocusing and correction of image shake with a polymer actuator that serves as a driving source.

BACKGROUND

In the small-sized image pickup apparatus of a digital camera or of a camera built in a cell-phone, image quality deterioration caused by image shake has become a problem, as the apparatus is downsized more and more, and mounting of an image shake correction section is becoming indispensable. Further, a small-sized image pickup apparatus installed in a digital camera or in a cell-phone is required to be smaller in size, to be lower in cost and to have higher functions at the same time. The higher functions mean functions such as "autofocus function", "automatic exposure control function" and "image shake correction function" which have been realized on a digital camera. As actuators for realizing the aforesaid functions in the conventional digital camera, an actuator optimum for each function was developed and adopted independently.

A principle of the image shake correction will be explained as follows, referring to FIG. 11 which is a schematic diagram for illustrating the principle of the image shake correction.

In FIG. 11, image pickup apparatus 1 is provided with image pickup optical system 211 composed of lens 211 and lens 212, image pickup device 162 and image shake detection section 301. When optical axis 200 of image pickup optical system 211 is deflected by image shake in the vertical direction (hereinafter referred to as P direction: meaning of Pitch), the horizontal direction (hereinafter referred to as Y direction: meaning of Yaw) or in the direction of composition of the vertical and horizontal directions, the image shake detection section 301 detects the direction and an amount of the deflection, and the image pickup device 162 or the lens 211b that is a part of the image pickup optical system 211 is moved in the P direction, Y direction or in both directions of P and Y to cancel the image shake, and a subject image on the image pickup device is kept to be fixed constantly. The foregoing is a principle of the image shake correction.

As a conventional image shake correction, there have been suggested a mechanism (for example, see Japanese Laid-Open Patent Publication No. 2003-110919) to correct image shake by moving an image pickup device by the use of a linear actuator (SIDM: Smooth Impact Drive Mechanism) wherein a piezoelectric element, for example, serves as a driving source and a mechanism (for example, see Japanese Laid-Open Patent Publication No. 2001-194571) to correct image shake by moving a lens that is a part of the image pickup optical system with string-like shape-memory alloy (SMA: Shape Memory Alloys) that serves as a driving source. Further, there has been suggested that a driving section of a calibration device of an image pickup apparatus having a function of correcting image shake with a polymer actuator serving as a driving source (for example, see Japanese Laid-Open Patent Publication No. 2005-330457).

Further, for example, a voice coil motor using electromagnetic force and a linear actuator using a piezoelectric element as a driving source (SIDM: Smooth Impact Drive Mechanism) are used for the "autofocus function", and a diaphragm mechanism employing a galvanometer is used for the "automatic exposure control function".

As a mounting method of an actuator for the foregoing, there has been suggested a camera module carried by a cell-phone, for example, wherein the actuator is formed on a base plate of an image sensor for achieving downsizing (for example, see Japanese Laid-Open Patent Publication No. 2003-204470). There has further been suggested one wherein a supporting mechanism for focusing and that for tilting are formed integrally in a lens holder of an optical pickup device (for example, see Japanese Laid-Open Patent Publication No. 10-106013).

However, a suggestion of Japanese Laid-Open Patent Publication No. 2003-204470 is limited to the "function of correcting image shake", and a separate actuator needs to be provided for the "autofocus function". In the suggestion of Japanese Laid-Open Patent Publication No. 10-106013), an actuator for focusing and an actuator for tilting are used separately, although the supporting mechanism is integrated, and there are problems in terms of a size, a simplicity of assembly and adjustment and cost in mounting plural different actuators on an ultracompact equipment such as a cell-phone, even when each actuator is downsized.

Recently, on the other hand, a polymer actuator is attracting public attention on the points that it generates great force, it is light in weight, it is noiseless, it can be driven by low voltage, and it can be formed to be any shape in forming because it is resin.

However, in the method of Japanese Laid-Open Patent Publication No. 2003-110919, spaces are required on the circumference and on the rear side of an image pickup device for arranging SIDM, and when driving in at least two axes are required as in the case of image shake correction, one SIDM must drive including the other SIDM for at least one direction because SIDM is a uniaxial driving element, and the total apparatus tends to be large in size and heavy in weight because an object to be driven becomes heavy and SIDM having large driving force is required.

Further, in the method of Japanese Laid-Open Patent Publication No. 2001-194571, SMA that is large to a certain extent is required to increase an amount of displacement, because an amount of displacement of SMA is relatively small, and a space for arranging SMA tends to be large. In addition, the speed of response of SMA is not so high because SMA is controlled by thermal response, resulting in an aspect that SMA lacks high responsiveness.

However, in the suggestion of Japanese Laid-Open Patent Publication No. 2005-330457, neither specific means nor specific method is suggested, except a description that a polymer actuator is suitable for a driving portion of a calibration device of an image pickup apparatus having a function of correcting image shake.

SUMMARY

The present invention has been achieved in view of the aforesaid circumstances, and its objective is to provide a small-sized and highly efficient drive apparatus, an image pickup unit and an image pickup apparatus which employ a polymer actuator. In view of forgoing, one embodiment according to one aspect of the present invention is a drive apparatus, comprising:

a driven body; and a plurality of polymer actuators for moving the driven body, wherein the polymer actuators are arranged in at least approximately mutually orthogonal two directions of directions in which the driven body is moved.

According to another aspect of the present invention, another embodiment is an image pickup unit, comprising:

an image pickup optical system which provides a subject image;

an image pickup device for picking up the subject image provided by the image pickup optical system;

a polymer actuator for driving the image pickup optical system, which is a driven body, in a plane perpendicular to an image pickup optical axis; and an image shake correction section, wherein the polymer actuators are arranged in at least approximately mutually orthogonal two directions of directions in which the driven body is moved, and the image shake correction section corrects the subject image by controlling the polymer actuator to drive the driven body in a plane.

According to another aspect of the present invention, another embodiment is an image pickup unit, comprising:

an image pickup optical system which provides a subject image;

an image pickup device for picking up the subject image provided by the image pickup optical system;

a polymer actuator for driving the image pickup device, which is a driven body, in a plane perpendicular to an image pickup optical axis; and an image shake correction section, wherein the polymer actuators are arranged in at least approximately mutually orthogonal two directions of directions in which the driven body is moved, and the image shake correction section corrects the subject image by controlling the polymer actuator to drive the driven body in a plane.

According to another aspect of the present invention, another embodiment is an image pickup unit, comprising:

a lens barrel unit; the lens barrel unit including:

an image pickup optical system which provides a subject image; and an image pickup device for picking up the subject image provided by the image pickup optical system, wherein the image pickup optical system and the image pickup device are integrally arranged, a polymer actuator which has a plurality of displacement portions coming into contact with the lens barrel unit and drives the lens barrel unit as a whole with the displacement portions.

According to another aspect of the present invention, another embodiment is an image pickup unit, comprising:

an image pickup optical system which provides a subject image;

an image pickup device for picking up the subject image provided by the image pickup optical system, a polymer actuator for driving the image pickup optical system, which is a driven body; and an image shake correction section, wherein a plurality of the polymer actuators are arranged in at least one direction of directions in which the driven body is moved, and the image shake correction section corrects the subject image by controlling the polymer actuators to rotate the driven body.

According to another aspect of the present invention, another embodiment is an image pickup unit, comprising:

an image pickup optical system which provides a subject image;

an image pickup device for picking up the subject image provided by the image pickup optical system, a polymer actuator for driving the image pickup device, which is a driven body, in a plane perpendicular to an image pickup optical axis; and an image shake correction section, wherein a plurality of the polymer actuators are arranged in at least one direction of directions in which the driven body is moved, and the image shake correction section corrects the subject image by controlling the polymer actuators to move or rotate the driven body.

According to another aspect of the present invention, another embodiment is an image pickup apparatus, comprising:

an image pickup unit; the image pickup unit including:

an image pickup optical system which provides a subject image;

an image pickup device for picking up the subject image provided by the image pickup optical system;

a polymer actuator for driving the image pickup optical system, which is a driven body, in a plane perpendicular to an image pickup optical axis; and an image shake correction section, wherein the polymer actuators are arranged in at least approximately mutually orthogonal two directions of directions in which the driven body is moved, and the image shake correction section corrects the subject image by controlling the polymer actuator to drive the driven body in a plane, an image shake detection section for detecting an image shake of the image pickup unit, wherein the image shake correction section arranged in the image pickup unit controls a driving of the polymer actuators arranged in the image pickup unit based on a detection result of the image shake detection section.

According to another aspect of the present invention, another embodiment is an image pickup apparatus, comprising:

an image pickup unit; the image pickup unit including:

an image pickup optical system which provides a subject image;

an image pickup device for picking up the subject image provided by the image pickup optical system;

a polymer actuator for driving the image pickup device, which is a driven body, in a plane perpendicular to an image pickup optical axis; and an image shake correction section, wherein the polymer actuators are arranged in at least approximately mutually orthogonal two directions of directions in which the driven body is moved, and the image shake correction section corrects the subject image by controlling the polymer actuator to drive the driven body in a plane, an image shake detection section for detecting an image shake of the image pickup unit, wherein the image shake correction section arranged in the image pickup unit controls a driving of the polymer actuators arranged in the image pickup unit based on a detection result of the image shake detection section.

According to another aspect of the present invention, another embodiment is an image pickup unit, comprising:
an image pickup unit; the image pickup unit including:
an image pickup optical system for providing a subject image;
an image pickup device for picking up the subject image provided by the image pickup optical system; and
a drive apparatus; the drive apparatus having:
a driven body; and
a plurality of polymer actuators for moving the driven body, the polymer actuators are arranged in at least approximately mutually orthogonal two directions of directions in which the driven body is moved; and
a polymer actuator which is provided in a direction perpendicular to a plane containing the approximately mutually orthogonal two direction,
a focus detection section for detecting a focus condition of the subject image provided by the image pickup optical system;
an autofocus section which conducts a focusing operation by driving the polymer actuator based on a detection result of the focus detection section;
an image shake detection section which detects an image shake of the image pickup apparatus; and
an image shake correction section which corrects the image shake by driving the polymer actuators based on a detection result of the image shake detection section.

BRIEF DESCRIPTION OF THE DRAWINGS

FIGS. 20(a) and 20(b) are schematic diagrams showing the fourth example of a polymer actuator.

DETAILED DESCRIPTION OF THE PREFERRED EMBODIMENT

Figure 1:
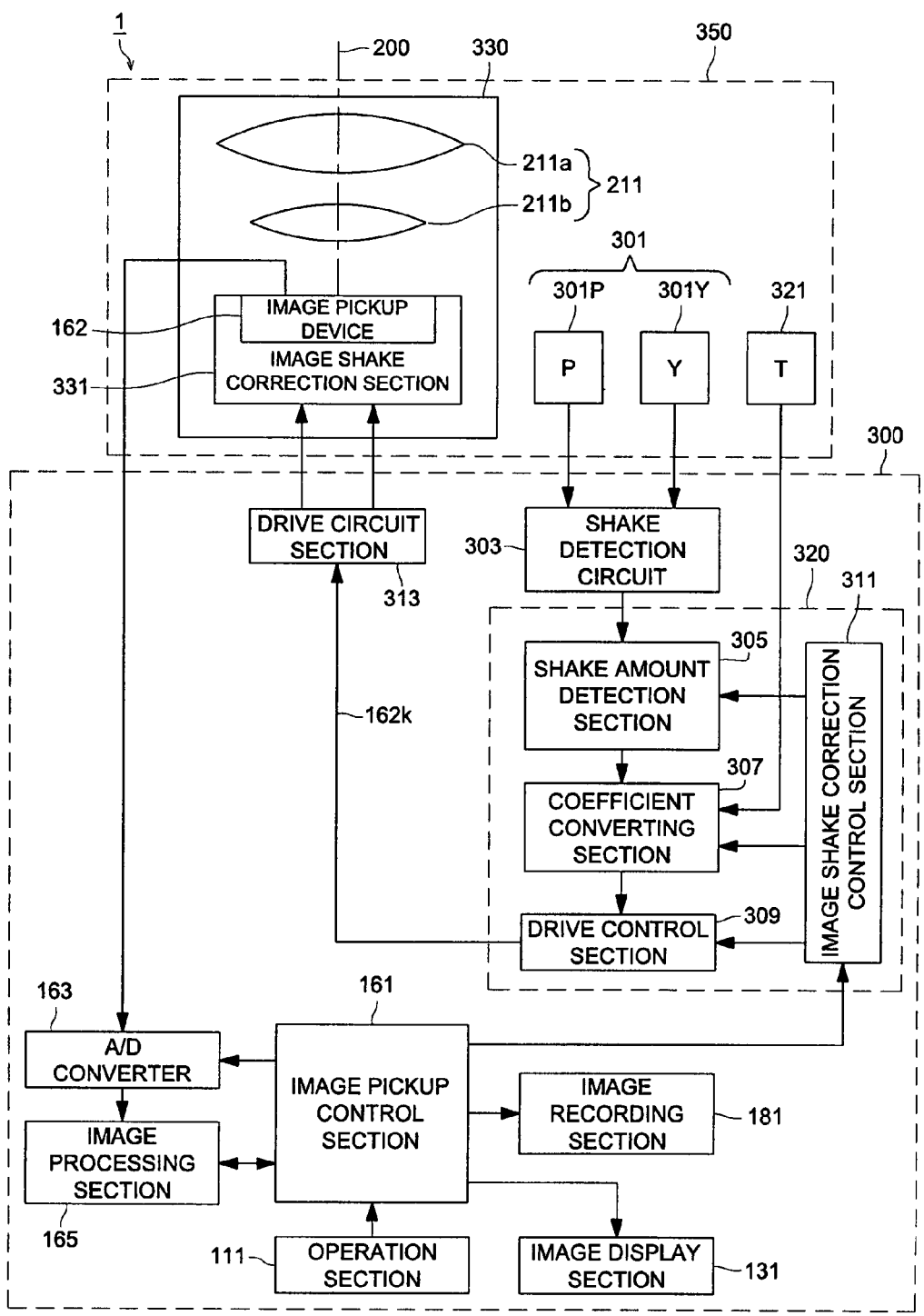
FIG. 1 is a schematic diagram showing an example of a structure of an image pickup apparatus.

An embodiment of the present invention will be explained, referring to the drawings. Incidentally, those identical to or equal to others are given the same numbers to omit overlapped explanations.

First, an image pickup apparatus in the invention will be explained by using FIG. 1 that is a schematic diagram showing the structure of image pickup apparatus 1.

In FIG. 1, image pickup apparatus 1 is composed of image pickup section 350 and image pickup circuit 300. The image pickup section 350 is composed of image pickup unit 330, image shake detection section 301 and temperature detection section 321. The image pickup unit 330 is composed of image pickup optical system 211 constituted with lens 211a and lens 211b, image pickup device 162, which is the driven body of the present invention, and image shake correction section 331, while the image shake detection section 301 is composed of vertical shake sensor 301P and horizontal shake sensor 301Y. The temperature detection section 321 is arranged in the vicinity of the image shake correction section 331, and detects temperature T in the vicinity of the image shake correction section 331.

The image pickup circuit 300 is composed of shake detection circuit 303, calculation control section 320, drive circuit section 313, image pickup control section 161, analog digital (A/D) converter 163, image processing section 165, image recording section 183, operation section 111 and image display section 131. The calculation control section 320 is composed of shake amount detection section 305, coefficient conversion section 307, drive control section 309 and of image shake correction control section 311, and it is realized by, for example, a micro-computer. Drive circuit section 313 includes a step-up circuit which generates voltage necessary to drive a polymer actuator that constitutes image shake correction section 331.

Image pickup apparatus 1 shown in FIG. 1 is roughly divided into two functions. One of them is an imaging function and the other is an image shake correction function. In the imaging function to be explained, an image of a subject is formed on an image pickup surface of image pickup device 162 by image pickup optical system 211, and the subject image is photoelectrically converted by image pickup device 162, to be outputted as image pickup data 162k. The image pickup data 162k thus outputted are converted into digital data by A/D converter 163, and are subjected to image processing such as white balance processing and gamma conversion in image processing section 165 and are displayed properly on image display section 131. These series of image pickup operations are controlled by imaging control section 161.

In the image shake correction function, image shake is detected by a sensor of image shake detection section 301 and by shake detection circuit 303, an amount of image shake in the vertical direction and that in the horizontal direction are detected by shake amount detection section 305, then, an amount of image shake in the vertical and horizontal directions detected by the shake amount detection section 305 is converted, by coefficient converting section 307, into an amount of drive in the vertical and horizontal directions of image pickup device 162, and thereby, voltage is impressed on a polymer actuator constituting image shake correction section 331 by drive control section 309 and drive circuit section 313, whereby, image pickup device 162 is moved in the vertical and horizontal directions to correct image shake.

The image shake correction section 331 will be described in detail on FIG. 3(a) and thereafter. Further, temperature T in the vicinity of the image shake correction section 331 detected by temperature detection section 321 is inputted into coefficient converting section 307, to be used when an amount of image shake in the vertical and horizontal directions detected by shake amount detection section 305 is converted into an amount of drive in the vertical and horizontal directions of image pickup device 162. Details will be explained on FIG. 10.

Next, a principle of operations of a polymer actuator used in the present invention will be explained, referring to FIG. 2 which is a schematic diagram for illustrating an operation principle of a polymer actuator.

Figure 2:
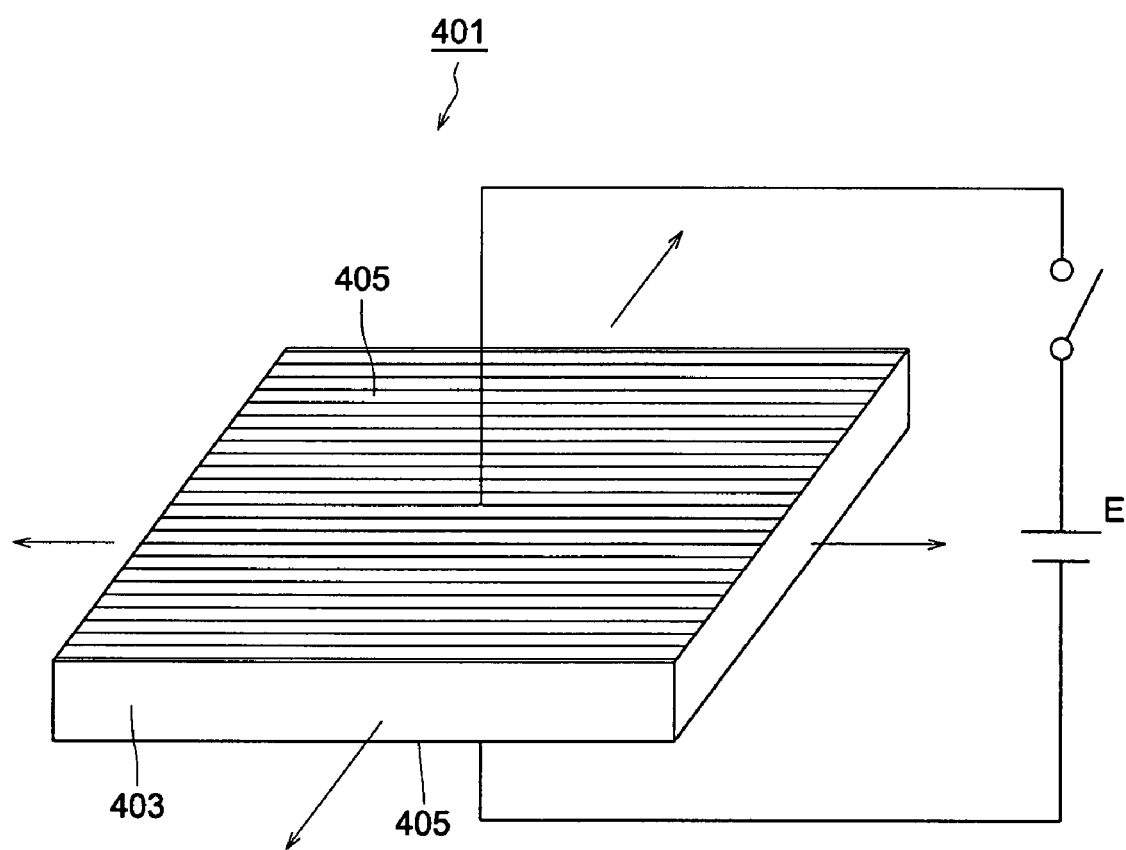
FIG. 2 is a schematic diagram for illustrating a principle of operations of a polymer actuator.

In FIG. 2, polymer actuator 401 is composed of extending portion 403 made of dielectric polymer (silicone resin and acryl-based resin) and of electrode 405 made of high-molecular material mixed with conductive carbon particles provided on both sides of the extending portion 403. When voltage V is applied between electrodes 405, electrostatic suction is generated between the electrodes to attract the electrodes, resulting in a case where the extending portion 403 made of dielectric polymer representing an elastic body is extended in directions of the arrows, and a size of extension is proportional approximately to a size of voltage V.

When electrode 405 is made to be a partial electrode, extending portion 403 that is directly under the partial electrode only is extended, whereby, it is possible to make the so-called actuator array wherein plural polymer actuators are arranged, by dividing the electrode 405 into plural partial electrodes, and by driving each partial electrode separately. A polymer actuator has characteristics that it generates great force, it is light in weight, it is noiseless, it can be driven by low voltage, and it can be formed to be any shape in forming because it is resin.

Next, the first embodiment of the image shake correction section 331 employing the polymer actuator 401 will be explained as follows, referring to FIGS. 3(a), 3(b) and 3(c) and FIG. 4. Each of FIGS. 3(a), 3(b) and 3(c) is a schematic diagram showing a structure of the first embodiment of the image shake correction section 331, and FIG. 3(a) is a longitudinal sectional view taken on line A-A' in FIG. 3(c), FIG. 3(b) is a perspective view showing a shape of polymer actuator 401 used in the first embodiment and FIG. 3(c) is a transverse sectional view taken on line B-B' in FIG. 3(a).

In FIG. 3(a), image pickup device chip 162b of image pickup device 162 is arranged at an image forming position on optical axis 200 of image pickup optical system 211 that is composed of lens 211a and lens 211b, and the image pickup device chip 162b is mounted in image pickup device package 162a. The image pickup device package 162a is arranged in fixing section 331a of image shake correction section 331, and polymer actuator 401 is arranged between the image pickup device package 162a and the fixing section 331a.

In FIG. 3(b), polymer actuator 401 has therein flat portion 401a and projection-shaped displacement portion 401b, and it is formed integrally by, for example, injection molding. The polymer actuator may take any shape fitting in a space for insertion, without being limited to one shown here. Since an amount of extension of the polymer actuator is proportional approximately to a size of voltage V to be impressed as explained in FIG. 2, it is preferable that a thickness of the displacement portion 401b is similar to that of the flat portion 401a, for utilizing efficiently voltage V to be impressed.

Electrodes 405 shown in FIG. 2 are provided on the entire surface excluding the top portion of the displacement portion 401b that comes in contact with the image pickup device package 162a, on the top side of the page of the drawing, for example, while, the electrodes are provided on the entire surface including the recessed portions of the displacement portion 401b on the bottom side of the page of the drawing.

In FIG. 3(c), four polymer actuators 401 shown in FIG. 3(b) are arranged in a way wherein the top portions of the displacement portions 401b come in contact with respective sides of the image pickup device package 162a, while regularly facing respective four sides including shorter sides and longer sides of the image pickup device package 162a, and rear sides of the flat portions 401a come in contact with inner wall surfaces of the fixing section 331a. Let it be assumed that polymer actuators 401 regularly facing respectively shorter sides of the image pickup device package 162a are 401y1 and 401y2, and polymer actuators 401 regularly facing respectively longer sides of the image pickup device package 162a are 401P1 and 401P2. In this case, the line which goes through polymer actuators 401P1 and 401P2 and the line which goes through polymer actuators 401Y1 and 401Y2 intersect orthogonally with each other.

Flat portions 401a other than displacement portions 401b of polymer actuators 401 are interposed between regulating members 331b fixed on fixing sections 331a and fixing sections 331a so that the flat portions 401a cannot be extended even when a voltage is impressed. Recessed portions of the displacement portions 401b are in contact with projections provided on fixing sections 331a, and extensions toward the fixing sections 331a are regulated. However, a gap for the displacement portions 401b to be deformed when it is pressed from image pickup device package 162a side is provided.

Figure 3:
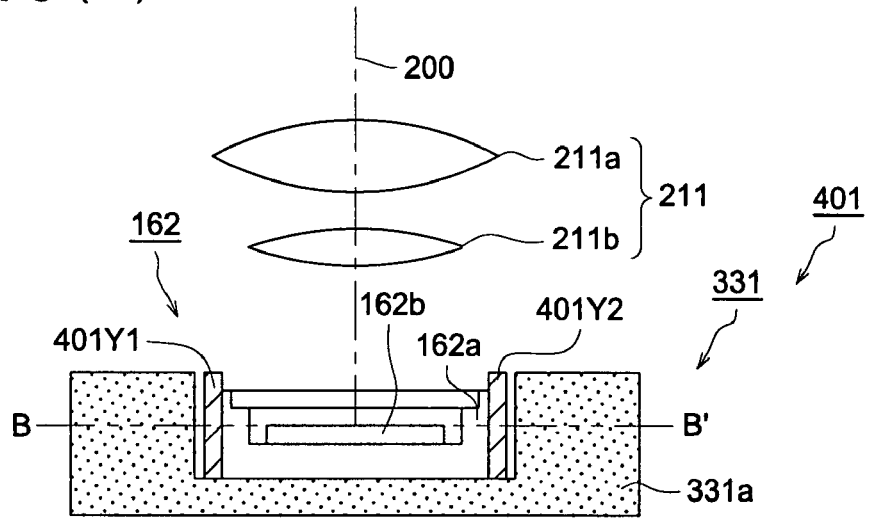
FIGS. 3(a), 3(b) and 3(c) are schematic diagrams showing a structure of the first embodiment of an image shake correction section.
Figure 3:
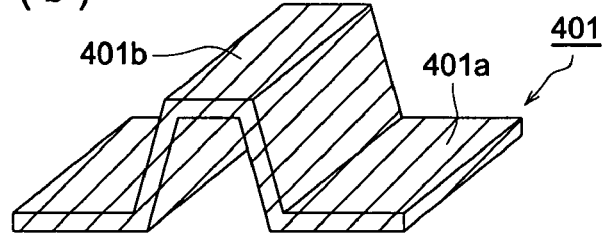
Figure 3:
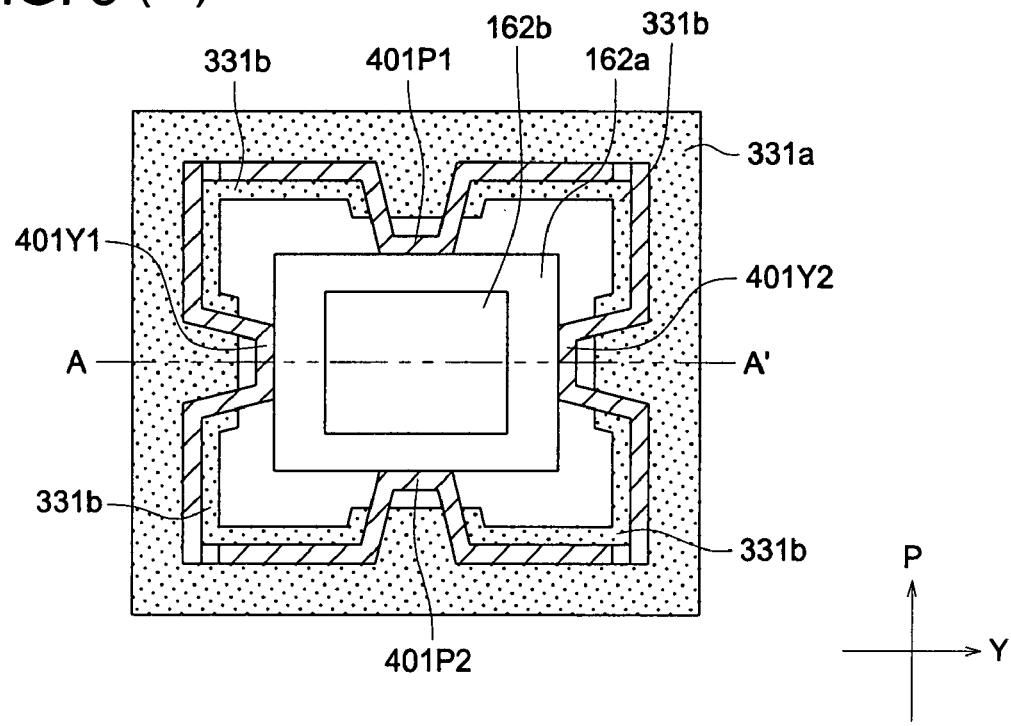
Figure 4:
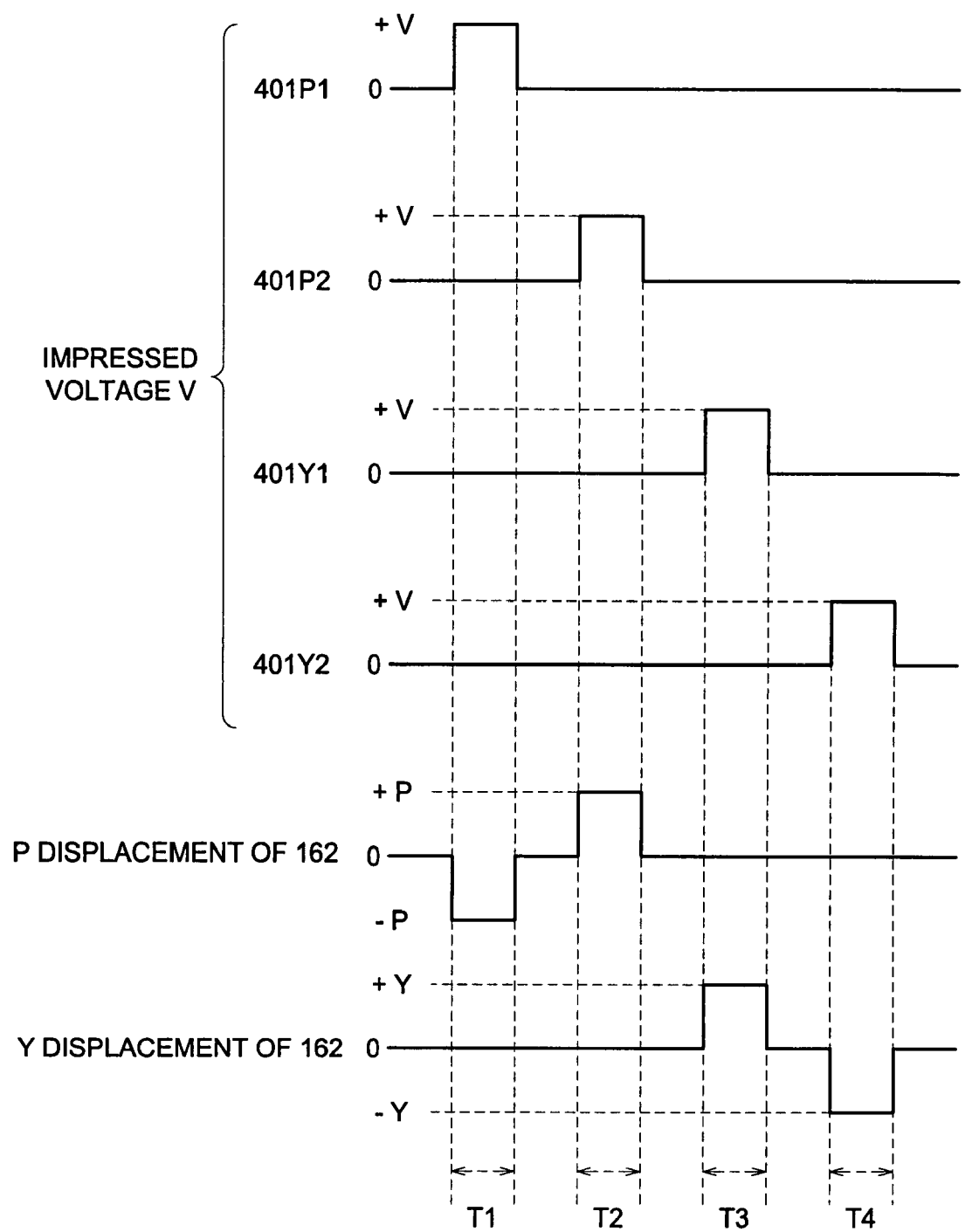
FIG. 4 is a timing chart showing relationship between a voltage impressed on a polymer actuator in the first embodiment and a displacement of an image pickup device.

FIG. 4 is a timing chart showing relationship between voltage V to be impressed on four polymer actuators 401P1, 401P2, 401Y1 and 401Y2 explained in FIGS. 3(a), 3(b) and 3(c) and displacement in P direction and in Y direction of image pickup device 162.

In FIG. 4, when a voltage of +V is impressed on polymer actuator 401P1 located at the upper portion in FIG. 3(c) at timing T1, displacement portion 401b of the polymer actuator 401P1 only is extended because portions other than displacement portion 401b of the polymer actuator 401P1 are interposed between regulating members 331b and fixing sections 331a to be unable to extend, and then, the displacement portion 401b is pressed by image pickup device package 162a to shrink because polymer actuator 401P2 is made of soft dielectric polymer, and totally, the image pickup device package 162a of the image pickup device 162 is pressed downward in FIG. 3(c), and the image pickup device 162 is displaced in the −P direction.

In the same way, when a voltage of +V is impressed on polymer actuator 401P2 at timing T2, displacement portion 401b of the polymer actuator 401P2 is extended, and then, the displacement portion 401b of the polymer actuator 401P1 is pressed by image pickup device package 162a to shrink, and the image pickup device package 162a of the image pickup device 162 is pressed upward in FIG. 3(c), and the image pickup device 162 is displaced in the +P direction.

When a voltage of +V is impressed on polymer actuator 401Y1 on the left side in FIG. 3(c) at timing T3, displacement portion 401b of the polymer actuator 401Y1 is extended, and then, the displacement portion 401b of the polymer actuator 401Y2 is pressed by image pickup device package 162a to shrink, and the image pickup device package 162a of the image pickup device 162 is pressed to the right side in FIG. 3(c), and the image pickup device 162 is displaced in the +Y direction.

In the same way, when a voltage of +V is impressed on polymer actuator 401Y2 at timing T4, displacement portion 401b of the polymer actuator 401Y2 is extended, and then, the displacement portion 401b of the polymer actuator 401Y1 is pressed by image pickup device package 162a to shrink, and the image pickup device package 162a of the image pickup device 162 is pressed to the left side in FIG. 3(c), and the image pickup device 162 is displaced in the −Y direction.

If a voltage at timing T1 and a voltage at timing T3 are impressed simultaneously, the image pickup device package 162a is pressed downward to the right in FIG. 3, and the image pickup device 162 is displaced in the −P/+Y direction. In the same way, if a voltage at timing T1 and a voltage at timing T4 are impressed simultaneously, the image pickup device 162 is displaced in the −P/−Y direction, if a voltage at timing T2 and a voltage at timing T3 are impressed simultaneously, the image pickup device 162 is displaced in the +P/+Y direction, and if a voltage at timing T2 and a voltage at timing T4 are impressed simultaneously, the image pickup device 162 is displaced in the +P/−Y direction.

Incidentally, FIG. 4 is a timing chart for illustrating operations of the displacement portion of the polymer actuator, and when it is applied to the actual image shake correction, an amount of displacement of the displacement portion of the polymer actuator needs to be controlled based on an amount of image shake, thus, impressed voltage V is impressed on an analog basis (including duty control by digital signals), and a displacement of the displacement portion is controlled in accordance with the impressed voltage V. When controlling a position at higher accuracy, it is preferable to detect the position of the displacement portion with a position sensor and to control the driving position with servo control. The contents described above are the same as those in the second through sixth embodiments for the image shake correction section which will be described later.

As shown above, in the first embodiment of the present image shake correction section, polymer actuator 401 can be arranged in a narrow gap between image pickup device 162 and fixing section 331a of image shake correction section 331, to show the space efficiency which is extremely excellent, and driving for that is as simple as impressing a voltage only, and it can be controlled easily.

Next, the second embodiment of image shake correction section 331 employing polymer actuator 401 will be explained as follows, referring to FIG. 5(a), FIG. 5(b) and FIG. 6. Each of FIGS. 5(a) and 5(b) is a schematic diagram showing the structure of the second embodiment of image shake correction section 331, and FIG. 5(a) is a structural diagram of the second embodiment of image shake correction section 331, while, FIG. 5(b) is a structural diagram of polymer actuators 401.

In FIG. 5(a), polymer actuators 401 have therein four displacement portions 401b (401b1, 401b2, 401b3 and 401b4 in the counterclockwise direction from the upper right in the drawing) which are in contact respectively with four corners of image pickup device package 162a and are integrally formed. Flat portions 401a other than displacement portions 401b of polymer actuators 401 are interposed between regulating members 331b fixed on fixing sections 331a and fixing sections 331a so that the flat portions cannot be extended even when a voltage is impressed. Further, between a reverse side of the face touching four corners of image pickup device package 162a of four displacement portions 401b and fixing sections 331a, there are provided gaps for four displacement portions 401b to be deformed when they are pushed from the image pickup device package 162a side.

If the image pickup device package 162a is not square, action lines of driving force of four displacement portions 401b do not agree each other in terms of position though they meet at right angles. Therefore, in the second embodiment of the image shake correction section, it is possible not only to move the image pickup device 162 in the horizontal direction and in the vertical direction inside the image shake correction section 331, but also to rotate it on the page of the drawing (hereinafter referred to as R direction).

In FIG. 5(b), an electrode corresponding to electrode 405 on one side shown in FIG. 2 is provided on the entire surface excluding corner portions of displacement portion 401b, of polymer actuators 401, touching the image pickup device package 162a on the side (inside of the drawing) facing the image pickup device package 162a. And it is divided into four partial electrodes 4051, 4052, 4053 and 4054) on the portion interposed between, for example, regulating members 331b and fixing sections 331a so that four individual voltage can be applied to the four displacement portions 401b. Electrode on the other side is provided, as a common electrode, on the entire surface of the side (outer circumference) of the polymer actuators 401 that is in contact with an inner wall of the fixing section 331a.

Figure 5:
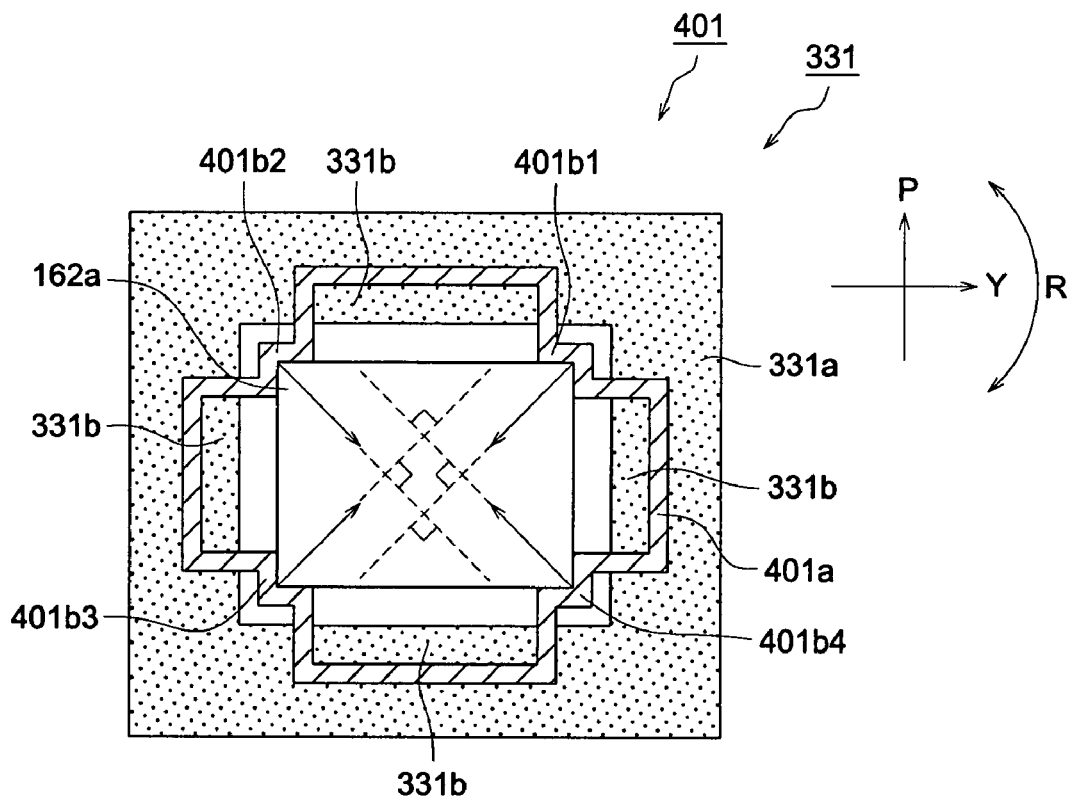
FIGS. 5(a) and 5(b) are schematic diagrams showing a structure of the second embodiment of an image shake correction section.
Figure 5:
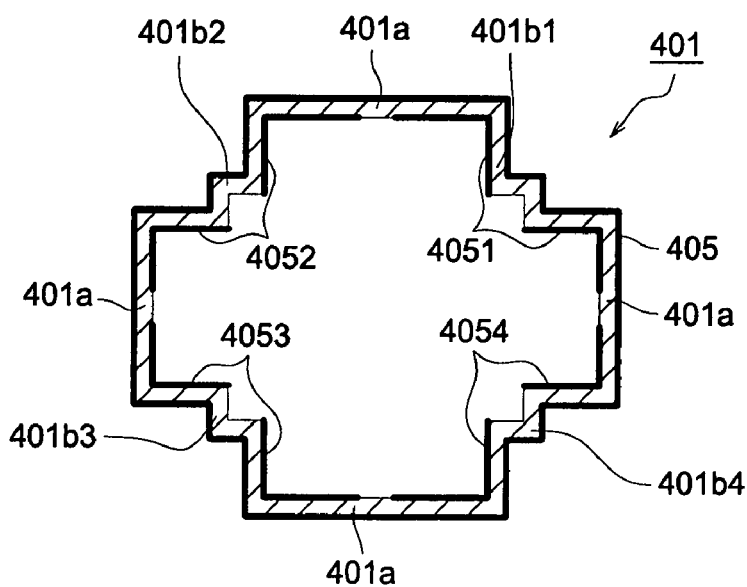
Figure 6:
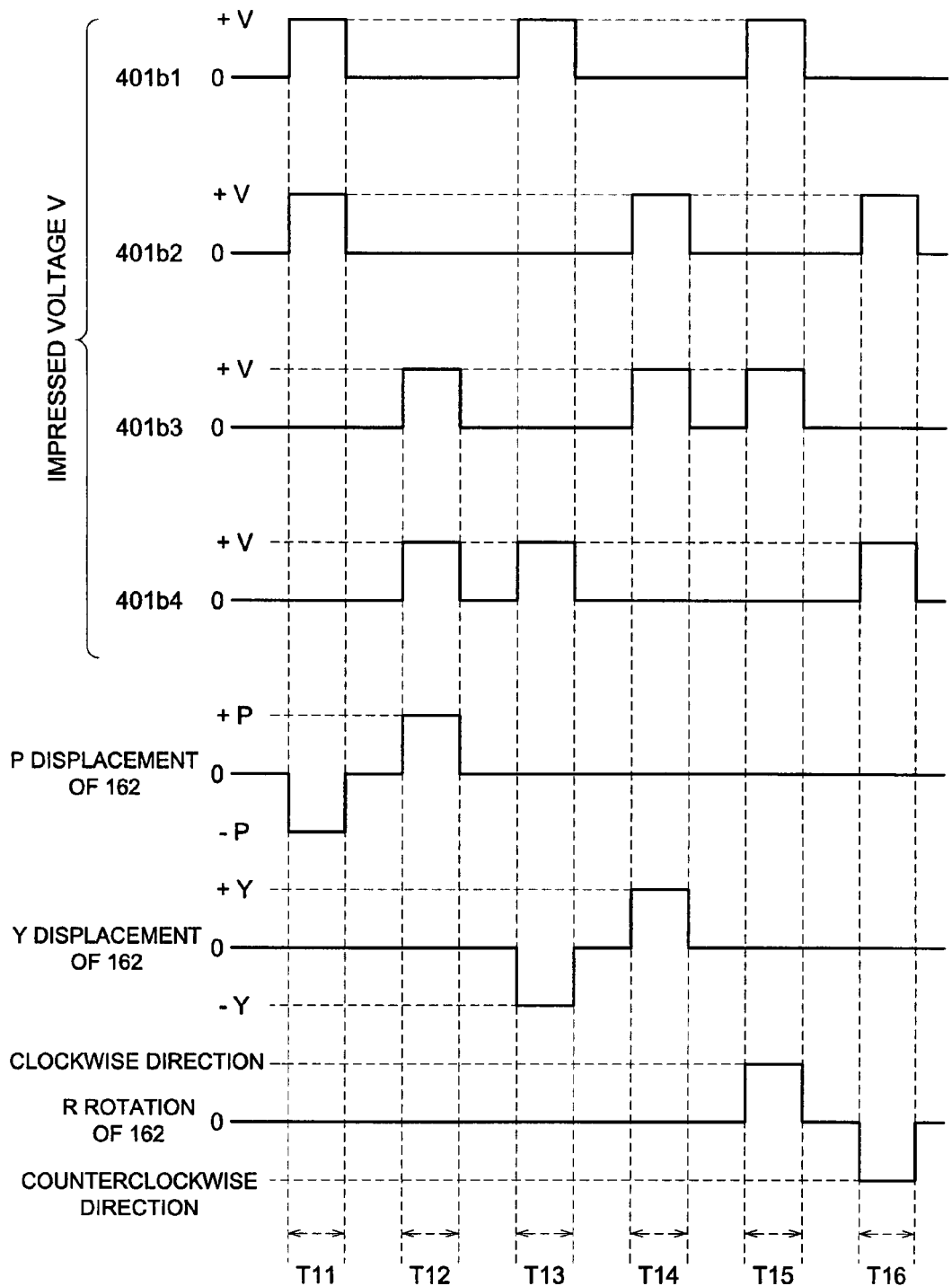
FIG. 6 is a timing chart showing relationship between a voltage impressed on a polymer actuator and a displacement of an image pickup device in the second embodiment.

FIG. 6 is a timing chart showing relationship between voltage V impressed on four displacement portions 401b1, 401b2, 401b3 and 401b4 of the polymer actuators 401 explained in FIGS. 5(a) and 5(b) and displacement in P direction, displacement in Y direction and rotation in R direction.

In FIG. 6, when voltage of +V is impressed on displacement portion 401b1 on the upper right and on displacement portion 401b2 on the upper left in FIG. 5(a) at timing T11, the displacement portion 401b1 and the displacement portion 401b2 are extended, because the portion other than the displacement portion is interposed between the regulating member 331b and fixing section 331a to be unable to extend, and the image pickup device 162 is pressed downward in FIG. 5(a) to be displaced in the −P direction. In the same way, when voltage of +V is impressed on displacement portion 401b3 and on displacement portion 401b4 at timing T12, the displacement portion 401b3 and the displacement portion 401b4 are extended, and the image pickup device 162 is pressed upward in FIG. 5(a) to be displaced in the +P direction.

When voltage of +V is impressed on displacement portion 401b1 and on displacement portion 401b4 at timing T13, the displacement portion 401b1 and the displacement portion 401b4 are extended, and the image pickup device 162 is pressed leftward in FIG. 5(a) to be displaced in the −Y direction. In the same way, when voltage of +V is impressed on displacement portion 401b2 and on displacement portion 401*b*3 at timing T14, the displacement portion 401*b*2 and the displacement portion 401*b*3 are extended, and the image pickup device 162 is pressed rightward in FIG. 5(*a*) to be displaced in the +Y direction.

When voltage of +V is impressed on displacement portion 401*b*1 and on displacement portion 401*b*3 at timing T15, the displacement portion 401*b*1 and the displacement portion 401*b*3 are extended, and the image pickup device 162 receives force in the R direction in FIG. 5(*a*) to rotate clockwise. In the same way, when voltage of +V is impressed on displacement portion 401*b*2 and on displacement portion 401*b*4 at timing T16, the displacement portion 401*b*2 and the displacement portion 401*b*4 are extended, and the image pickup device 162 receives force in the R direction to rotate counterclockwise.

As shown in the foregoing, in the second embodiment of the present image shake correction section, polymer actuators 401 are arranged in a way to hold four corners of the image pickup device 162, and the image pickup device 162 is moved while its four corners are pressed, whereby, it is possible not only to move smoothly in the horizontal and vertical directions but also to rotate the image pickup device 162. It is further possible to arrange polymer actuators 401 in a narrow gap between the image pickup device 162 and fixing section 331*a* of image shake correction section 331 to achieve excellent space efficiency, thus, driving is only impressing a voltage which is extremely simple, and control is easy.

Next, the third and fourth embodiments of image shake correction section 331 employing polymer actuator 401 will be explained as follows, referring to FIGS. 7(*a*) and 7(*b*). Each of FIGS. 7(*a*) and 7(*b*) is a schematic diagram for illustrating the third and fourth embodiments of image shake correction section 331, and FIG. 7(*a*) is a diagram showing the structure of the third embodiment, while, FIG. 7(*b*) is a diagram showing the structure of the fourth embodiment.

Figure 7:
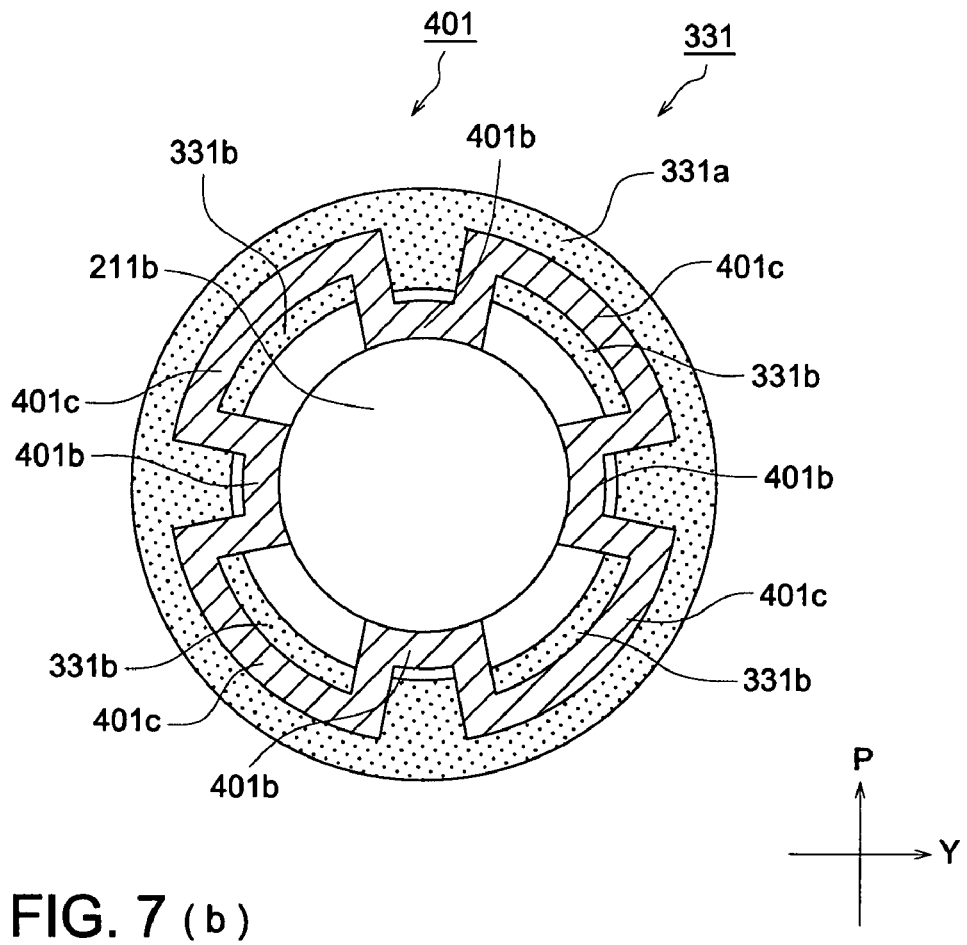
FIG. 7(a) is a schematic diagram for illustrating the third embodiment of an image shake correction section.
FIG. 7(b) is a schematic diagram for illustrating the fourth embodiment of an image shake correction section.
Figure 7:
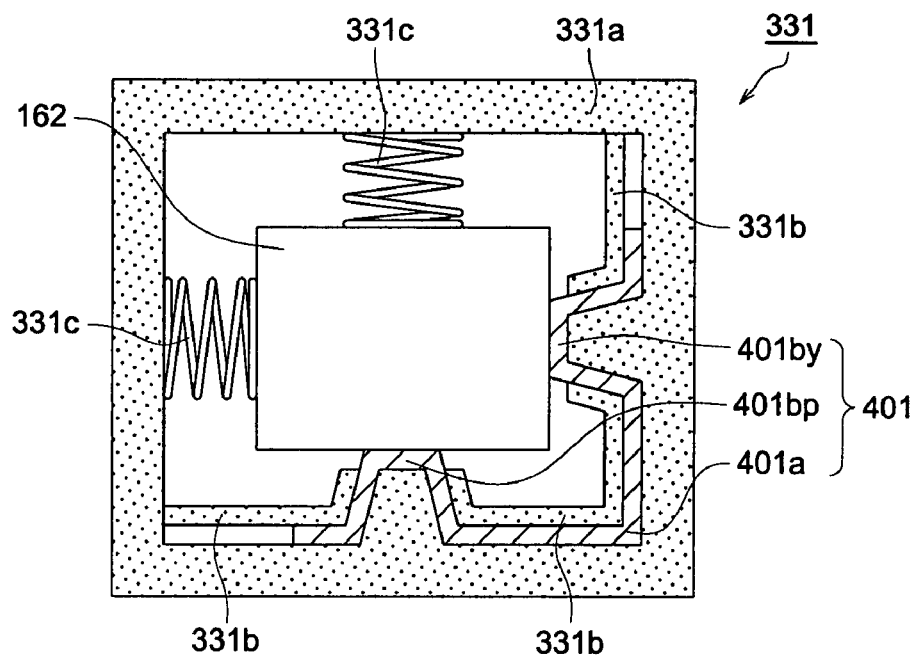

In FIG. 7(*a*), the image shake correction section 331 corrects image shake by moving lens 211*b*, which is the driven body of the present invention, that constitutes image pickup optical system 211. The lens 211*b* is arranged inside circle-shaped fixing section 331*a* of the image shake correction section 331, and polymer actuators 401 are arranged between the lens 211*b* and the fixing section 331*a*. The polymer actuators 401 are provided with four projection-shaped displacement portions 401*b* which are arranged with intervals of 90° circularly to be formed integrally.

Four thin portions 401*c* other than four displacement portions 401*b* are interposed between fixing section 331*a* and respective regulating members 331*b* which are fixed on the fixing section 331*a*, to be regulated so that they may not extend even when a voltage is impressed. Further, recessed portions of four displacement portions 401*b* are in contact with projections provided on fixing section 331*a*, to be regulated in terms of extension toward the fixing section 331*a*. However, a gap for deformation of the displacement portion 401*b* when it is pressed from the lens 211*b* side is provided between an edge of the recessed portion and a projection of the fixing section 331*a*.

An electrode structure of the polymer actuator 401 in the third embodiment of the image shake correction section can be the same as that in the second embodiment of the image shake correction section shown in FIG. 5(*b*). With respect to the driving method, driving is possible in the same driving method as that in the first embodiment of the image shake correction section shown in FIG. 4 if the condition is the same as that shown in FIG. 7, and driving is possible in the same driving method as that in the second embodiment of the image shake correction section shown in FIG. 6 if the condition is one rotated by 45° from the condition shown in FIG. 7(*a*). Though the lens 211*b* constituting image pickup optical system 211 is moved in the present example, the whole of the image pickup optical system 211 may also be moved. Since generating force of the polymer actuator is great, a heavy object such as the whole of the image pickup optical system 211 can be moved.

As shown above, in the third embodiment of the image shake correction section, any shape of polymer actuators 401 can be formed freely through injection molding, and it is possible to form a complicated shape as in the present example wherein a projection is provided inside the circle-shaped member, which cannot be imagined in an ordinary actuator, and the degree of freedom of shape is extremely high. It is further possible to arrange the polymer actuators 401 in a narrow gap between lens 211*b* and fixing section 331*a* of image shake correction section 331 to achieve excellent space efficiency, thus, driving is only impressing a voltage which is extremely simple, and control is easy.

In the fourth embodiment of the image shake correction section in FIG. 7(*b*), two polymer actuators 401Y2 and 401P2 out of the four polymer actuators 401 shown in FIG. 3(*c*) are formed integrally to be arranged as polymer actuators 401 having two projection-shaped displacement portions 401*bp* and 401*by*, and two bias springs 331*c* are arranged at positions corresponding to two polymer actuators 401Y1 and 401P1. An electrode structure of the polymer actuator 401 can be the same as that in the second embodiment of the image shake correction section shown in FIG. 5(*b*).

A situation shown in FIG. 7(*b*) is a situation wherein a voltage is not impressed on polymer actuator 401 wherein image pickup device 162 is pressed by bias spring 331*c* in the −P/+Y direction, displacement portions 401*bp* and 401*by* of the polymer actuator 401 are also pressed respectively against projections provided on fixing section 331*a*.

With respect to the driving method, it may be the same as that for polymer actuators 401Y2 and 401P2, and for movement of image pickup device 162 in the P direction, displacement portion 401*bp* extends, overcoming spring force of bias spring 331*c* and image pickup device 162 is pressed by the displacement portion 401*bp* to be moved in the +P direction, when voltage V to be impressed on an electrode of the displacement portion 401*bp* is made to be great, and image pickup device 162 is pressed by the spring force of bias spring 331*c* when voltage V to be impressed on an electrode of the displacement portion 401*bp* is made to be small, and the image pickup device 162 is moved in the −P direction. The foregoing also applies to the Y direction.

As shown above, in the fourth embodiment of the image shake correction section, each of the number of polymer actuators and the number of drive circuits can be made to be a half of that in the first embodiment, and even in that case, the same operations as in the first embodiment can be made.

Next, the fifth embodiment of image shake correction section 331 employing polymer actuator 401 will be explained as follows, referring to FIGS. 8(*a*) and 8(*b*). Each of FIGS. 8(*a*) and 8(*b*) is a schematic diagram for illustrating the fifth embodiment of image shake correction section 331, and FIG. 8(*a*) is a structural diagram of the fifth embodiment, while, FIG. 8(*b*) is a timing chart showing relationship between voltage V to be impressed on three displacement portions in the P direction out of five displacement portions of polymer actuators 401 and the rotation of the image pickup device 162.

Figure 8:
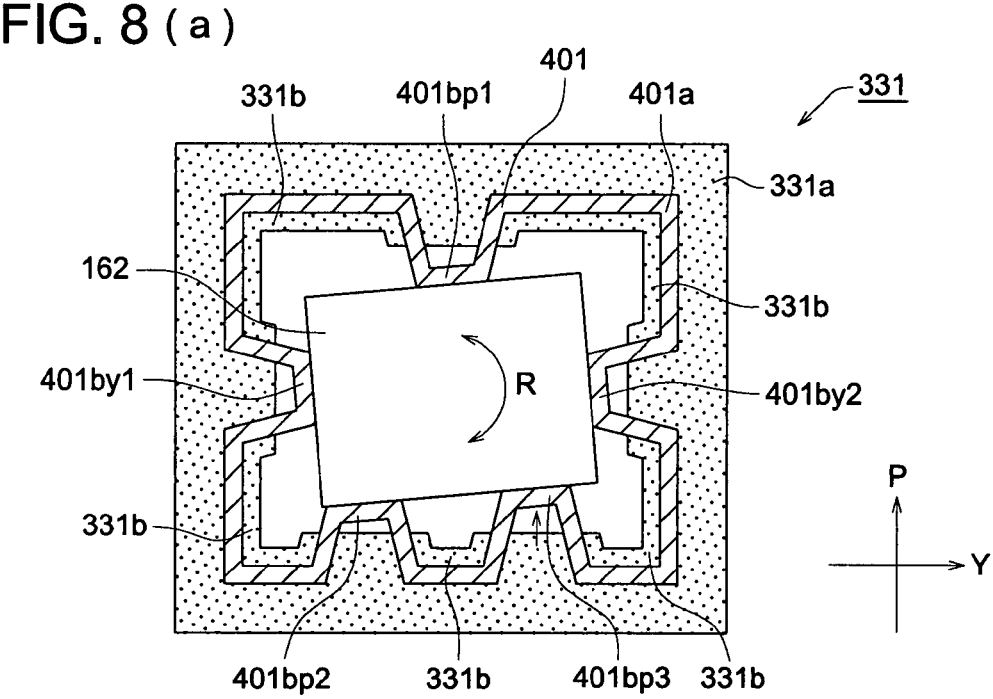
FIGS. 8(a) and 8(b) are schematic diagrams for illustrating the fifth embodiment of an image shake correction section.
Figure 8:
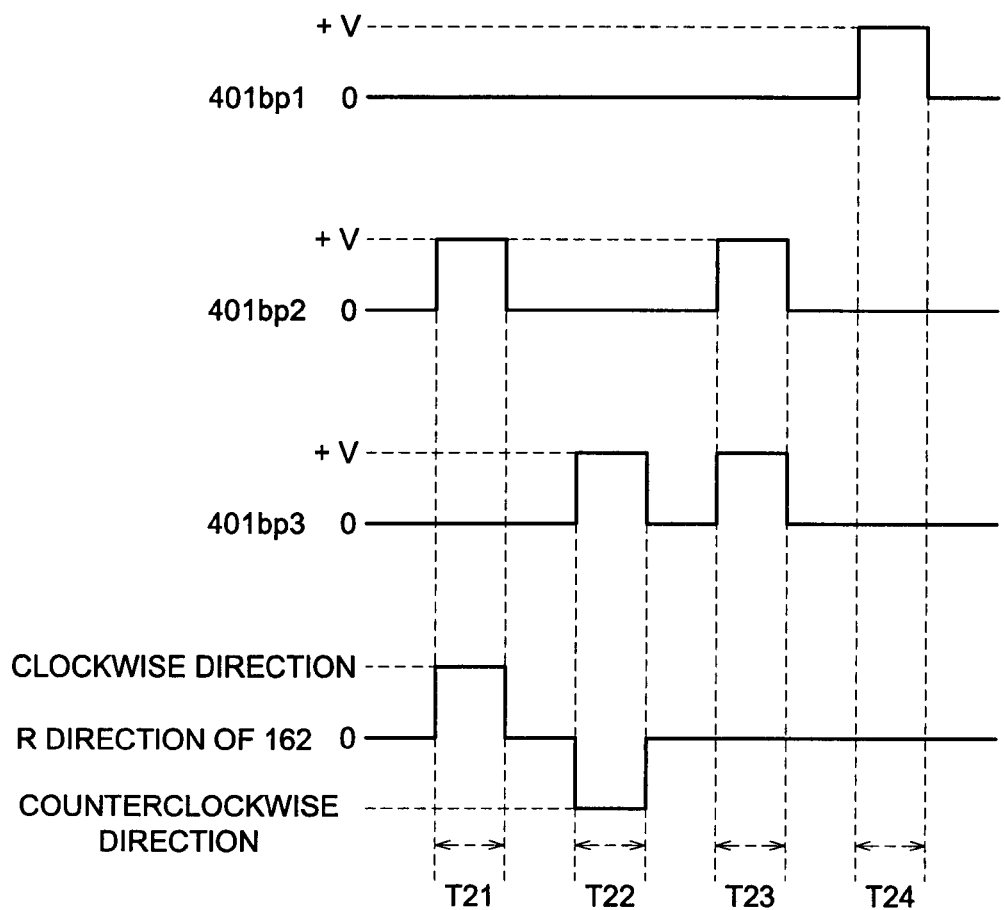

In FIGS. 8(*a*) and 8(*b*), image shake correction section 331 is one that enables image shake correction by a rotation in R direction shown in FIG. 8(*a*) in addition to image shake correction by parallel movement of image pickup device 162 in P direction and Y direction at image shake correction sections shown in FIGS. 3(a), 3(b) and 3(c), in the same way as in the second embodiment of the image shake correction section shown in FIGS. 5(a) and 5(b). Regarding the Y direction, the displacement portions 401by1 and 401by2 are used for driving, and its method is the same as those in FIGS. 3(a), 3(b) and 3(c) and FIG. 4, thereby, an explanation thereof will be omitted here.

In the P direction, polymer actuators 401 has three projection-shaped displacement portions in total, including displacement portion 401bp1 at the upper part in the drawing and displacement portions 401bp2 and 401bp3 at the lower part. Flat portions 401a other than displacement portions is interposed between regulating member 331b fixed on fixing section 331a and fixing section 331a so that it cannot be extended even when a voltage is impressed.

Recessed portions of the five displacement portions 401by1, 401by2, 401bp1, 401bp2 and 401bp3 are in contact respectively with projections provided on fixing section 331a, and extensions toward the fixing section 331a are regulated. However, a gap for deformation of the displacement portion when it is pressed from the image pickup device 162 side is provided.

Now, operations in the R direction will be explained. When a voltage is not impressed on displacement portion 401bp1 on the upper part and on displacement portion 401bp2 on the lower part out of three displacement portions in the P direction and a voltage is impressed on displacement portion 401bp3 on the lower part and thereby the displacement portion 401bp3 is extended, as exemplified in FIG. 8(a), for example, image pickup device 162 receives the force upward from the lower right of the drawing from the displacement portion 401bp3, to rotate counterclockwise on the plane of the drawing. In this case, the displacement portion 401bp1 on the upper part, the displacement portion 401bp2 on the lower part, and displacement portions 401by1 and 401by2 respectively on the left side and the right side are deformed by the counterclockwise rotation of the image pickup device.

In FIG. 8(b), when a voltage of +V is impressed on displacement portion 401bp2 on the lower left of the drawing at timing T21, the image pickup device 162 is rotated clockwise. When a voltage of +V is impressed on displacement portion 401bp3 on the lower right of the drawing at timing T22, the image pickup device 162 is rotated counterclockwise, which is exemplified in FIG. 8(a).

When a voltage of +V is impressed on displacement portion 401bp2 on the lower left and on displacement portion 401bp3 on the lower right of the drawing at timing T23, the image pickup device 162 is not rotated and moves in parallel in the +P direction. When a voltage of +V is impressed on displacement portion 401bp1 on the upper part of the drawing at timing T24, the image pickup device 162 is not rotated and moves in parallel in the −P direction.

As shown above, when a plurality of displacement portions are provided on polymer actuators in at least one direction in the fifth embodiment of an image shake correction section, it is possible to rotate image pickup device 162 in addition to its parallel displacement in the Y direction, whereby, image shake correction by rotation on optical axis 200 can also be made possible.

Next, the sixth embodiment of image shake correction section 331 employing polymer actuator 401 will be explained as follows, referring to FIGS. 9(a) and 9(b). Each of FIGS. 9(a) and 9(b) is a schematic diagram for illustrating the sixth embodiment of image shake correction section 331, and FIG. 9(a) is a structural diagram of the sixth embodiment of image shake correction section 331, while, FIG. 9(b) is a timing chart showing relationship between voltage V to be impressed on the displacement portions of polymer actuators 401 and the direction of deflection of optical axis 200.

The sixth embodiment of the image shake correction section is one to correct the image shake by moving the total lens barrel unit 220, which is the driven body of the present invention, constituted with lens barrel 201 housing therein image pickup optical system 211 composed of lenses 211a and 211b and with image pickup device 162 fixed on the lens barrel 201, by polymer actuators 401.

Figure 9:
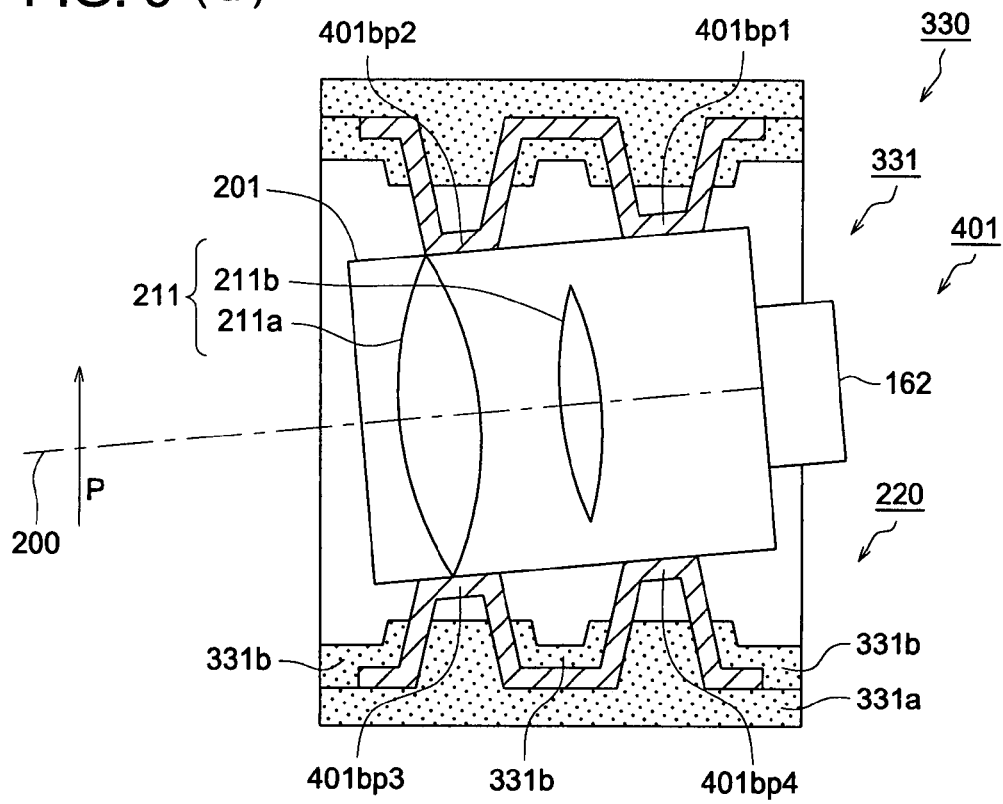
FIGS. 9(a) and 9(b) are schematic diagrams for illustrating the sixth embodiment of an image shake correction section.
Figure 9:
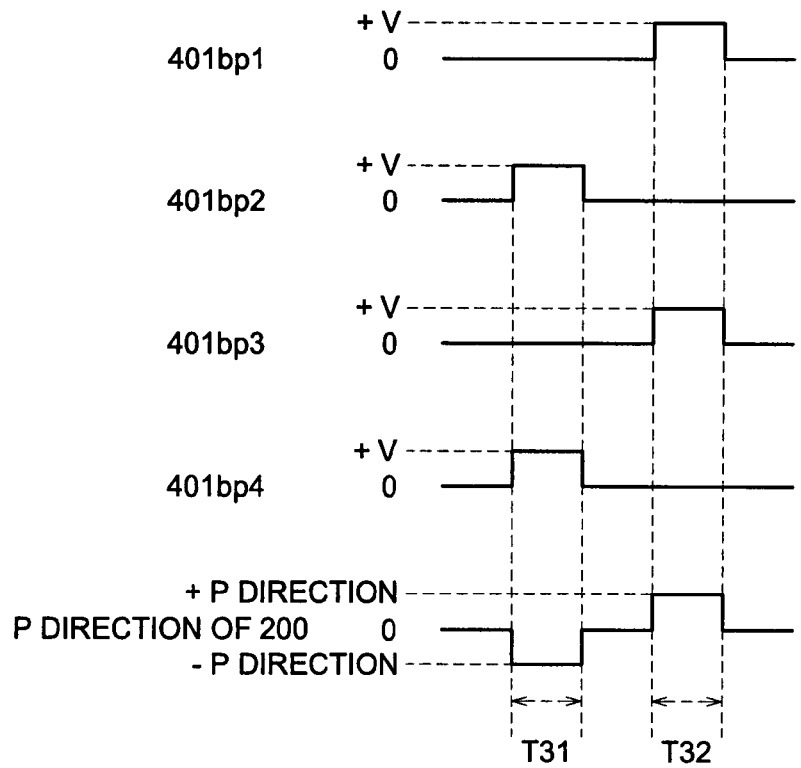

In FIG. 9(a), the polymer actuators 401 are of the structure wherein two projection-shaped displacement portions 401bp1 and 401bp2 are provided on the upper part of the drawing and two projection-shaped displacement portions 401bp3 and 401bp4 are provided on the lower part of the drawing, and lens barrel unit 220 is interposed between four displacement portions, and optical axis 200 can be moved in the P direction by rotating the total lens barrel unit. It is further possible to move the optical axis 200 also in the Y direction by arranging polymer actuators 401 having four displacement portions also in the Y direction, which is not illustrated.

In FIG. 9(b), when a voltage of +V is impressed on displacement portions 401bp2 and 401bp4 at timing T31, the displacement portions 401bp2 and 401bp4 are extended, and thereby, lens barrel unit 220 rotates in the −P direction and optical axis 200 rotates in the −P direction as shown in FIG. 9(a).

When a voltage of +V is impressed on displacement portions 401bp1 and 401bp3 at timing T32, the displacement portions 401bp1 and 401bp3 are extended, and thereby, lens barrel unit 220 rotates in the +P direction and optical axis 200 rotates in the +P direction as shown in FIG. 9(a).

As shown above, an optical axis itself can be moved by moving the total lens barrel unit 220 with polymer actuators, and thereby, the positional relationship between image pickup optical system 211 and image pickup device 162 is constantly fixed, thus, an image can be taken at all times at the best position of optical capability of the image pickup optical system 211, and the best image quality can be obtained.

Figure 10:
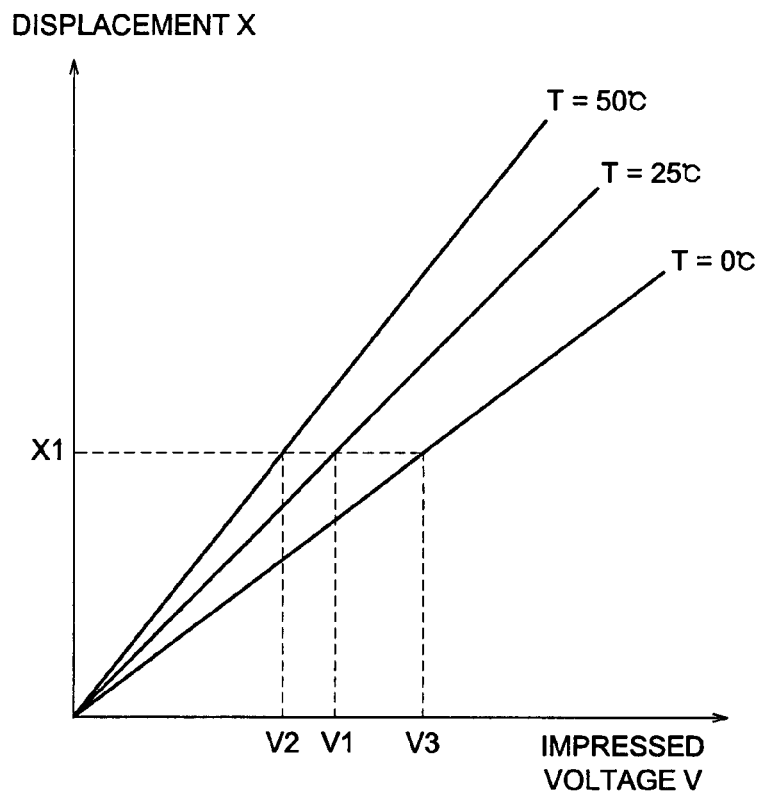
FIG. 10 is a schematic graph showing the temperature-dependency of displacement characteristics of a polymer actuator.
Figure 11:
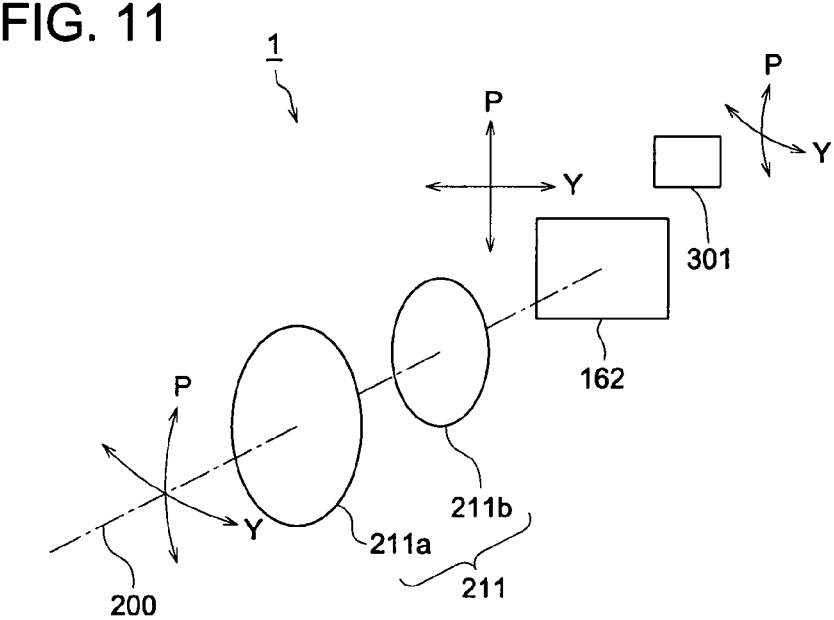
FIG. 11 is a schematic diagram for illustrating a principle of image shake correction.

Finally, correction of temperature characteristics of a polymer actuator will be explained as follows, referring to FIG. 10. FIG. 10 is a schematic graph showing temperature-dependency of displacement characteristics (characteristics showing relationship between impressed voltage V and displacement amount X) of the polymer actuator.

In FIG. 10, displacement characteristics of the polymer actuator generally show a linear characteristic, although it depends on the quality of the material, and impressed voltage V that causes the same displacement X1 is lower when a temperature is higher than a value (V1 in the drawing) at a normal temperature, and the impressed voltage V is higher (V3 in the drawing) when the temperature is lower.

With the foregoing mentioned above, it is possible to correct image shake not by the so-called closed loop control to control a voltage to be impressed while monitoring and feeding back an amount of displacement, but by the so-called open loop control, by storing voltage V to be impressed causing the same displacement shown in FIG. 10 into a memory in a form of a lookup table or of a coefficient of the function, then, by detecting temperature T in the vicinity of image shake correction section 331 by using temperature detection section 321 shown in FIG. 1, and by calculating voltage V to be impressed causing displacement X necessary for image shake correction from voltage V to be impressed stored in the aforesaid memory or the like and from detected temperature T and by impressing it on a polymer actuator.

If the open loop control can be used, the control can be simplified remarkably, and the control circuit can be made simple and low in cost.

Though an example wherein a drive apparatus having a polymer actuator and a driven body is used for an image shake correction section has been explained in the aforesaid embodiment, a use of the drive apparatus having a polymer actuator is not limited to this, and the drive apparatus can be used for focus drive for an image pickup optical system, zoom drive, diaphragm drive, shutter drive, and for mounting and dismounting of a memory means such as a memory card and a DVD disc. In addition, the drive apparatus can be used equally also for many mechanical driving sections in a car, a cell-phone, a personal computer (PC) and a portable information terminal (PDA).

As explained above, the present embodiment makes it possible to provide a drive apparatus that is small in size and has high response speed and has a high degree of freedom for arrangement, an image pickup unit and an image pickup apparatus, by providing a polymer actuator, and by moving substances to be driven such as an image pickup device, a lens, an image pickup optical system and a lens barrel unit.

Figure 12:
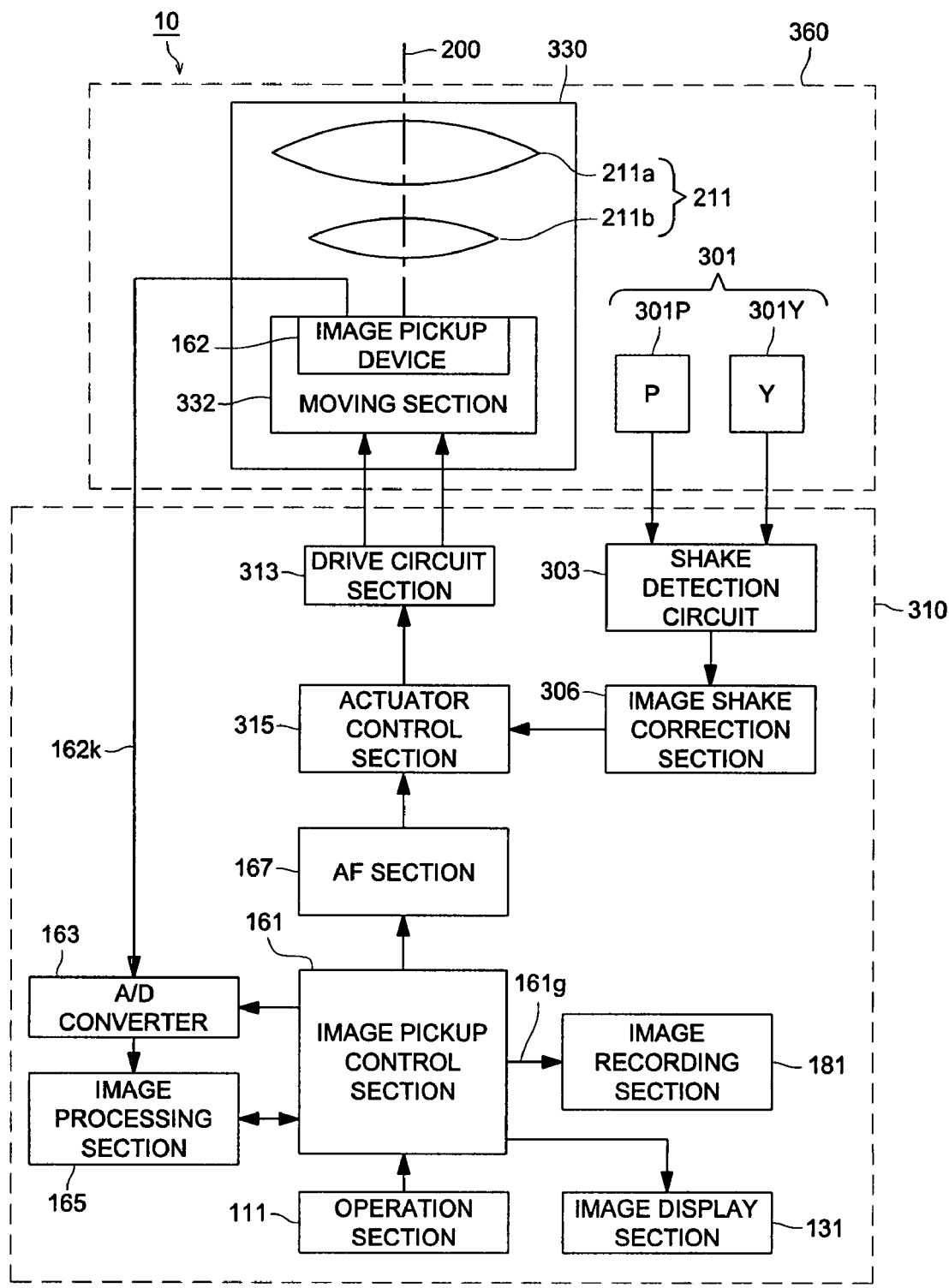
FIG. 12 is a schematic diagram showing an example of a structure of an image pickup apparatus.

Next, another example of an image pickup apparatus in the invention will be explained as follows, referring to FIG. 12. FIG. 12 is a schematic diagram showing the structure of image pickup apparatus 10.

In FIG. 12, image pickup apparatus 10 is composed of image pickup section 360 and image pickup circuit 310. The image pickup section 360 is composed of image pickup unit 330 and image shake detection section 301. The image pickup unit 330 is composed of image pickup optical system 211 having therein lens 211a and lens 211b, image pickup device 162 and moving section 332, while, the image shake detection section 301 is composed of vertical shake sensor 301P (which means Pitch) and horizontal shake sensor 301Y (which means Yaw).

The image pickup circuit 310 is composed of shake detection circuit 303, image shake correction section 306, AF section 167, actuator control section 315, drive circuit section 313, image pickup control section 161, analog digital (A/D) converter 163, image processing section 165, image recording section 181, operation section 111 and image display section 131. The drive circuit section 313 includes step-up circuit which prepares voltage needed to drive a polymer actuator that constitutes the moving section 332.

Image pickup apparatus 10 in FIG. 12 is roughly divided into two functions. One of them is an image pickup function, and the other is an image pickup device moving function. First, the image pickup function will be explained. An image of a subject is formed on an image pickup plane of image pickup device 162 by image pickup optical system 211, and the subject image is subjected to photoelectric conversion by image pickup device 162, and is outputted as image pickup data 162k. The outputted image pickup data 162k are converted into digital data by A/D converter 163, then, are subjected to image processing such as white balance processing and gamma conversion at image processing section 165 and are recorded on image recording section 181 as image data 161g, and displayed properly on image display section 131.

The image pickup device moving function is further divided into two functions including an image shake correction function that corrects the image shake for image pickup apparatus 10 and an AF function that focuses image pickup optical system 211.

In the image shake correction function, image shake is detected by a sensor of image shake detection section 301 and by shake detection circuit 303, an amount of image shake correction is calculated by image shake correction section 306, voltage is impressed by actuator control section 315 and drive circuit section 313 on polymer actuators constituting the moving section 332, and image pickup device 162 is moved vertically (hereinafter referred to as P direction) and horizontally (hereinafter referred to as Y direction), thus, image shake is corrected. In this case, shake detection circuit 303, image shake correction section 306, actuator control section 315, drive circuit section 313 and moving section 332 function as an image shake correction section in the invention.

In the AF function, image pickup device 162 is moved along optical axis 200, and image pickup optical system 211 is focused, when the contrast of an image taken by image pickup device 162 is calculated at AF section 167, and voltage is impressed by actuator control section 315 and drive circuit section 313 on polymer actuators constituting moving section 332, so that the contrast of the image may become the greatest. In this case, the AF section 167 functions as a focus detection section in the invention, and actuator control section 315, drive circuit section 313 and moving section 332 function as an autofocus section in the invention. The moving section 332 will be explained in detail on FIG. 13(a) and thereafter.

Incidentally, a principle of operations of a polymer actuator used in the present invention is the same as that explained in FIG. 2, and it is omitted here accordingly.

Next, the first embodiment of the moving section 332 employing polymer actuator 401 mentioned above will be explained as follows, referring to FIGS. 13(a) and 13(b) and FIG. 14. Each of FIGS. 13(a) and 13(b) is a schematic diagram showing the structure of the first embodiment of the moving section 332, and FIG. 13(a) is a sectional view on a plane of the moving section 332 that is parallel to optical axis 200, and FIG. 13(b) is a development showing a shape of polymer actuators 401 used for the first embodiment of the present moving section.

Figure 13:
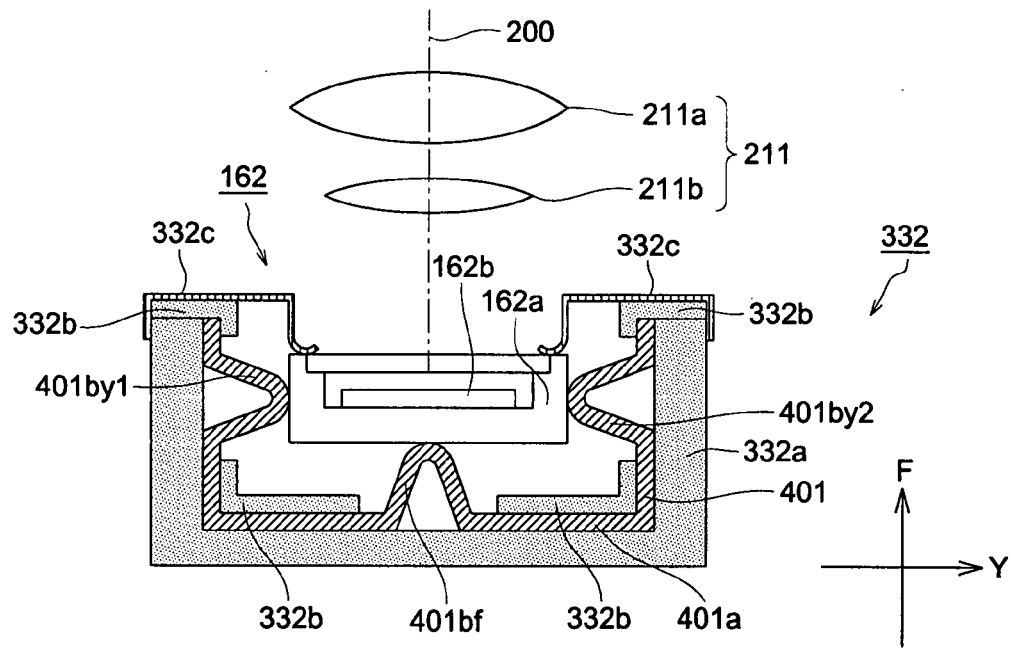
FIGS. 13(a) and 13(b) are schematic diagrams showing a structure of the first embodiment of a moving section.
Figure 13:
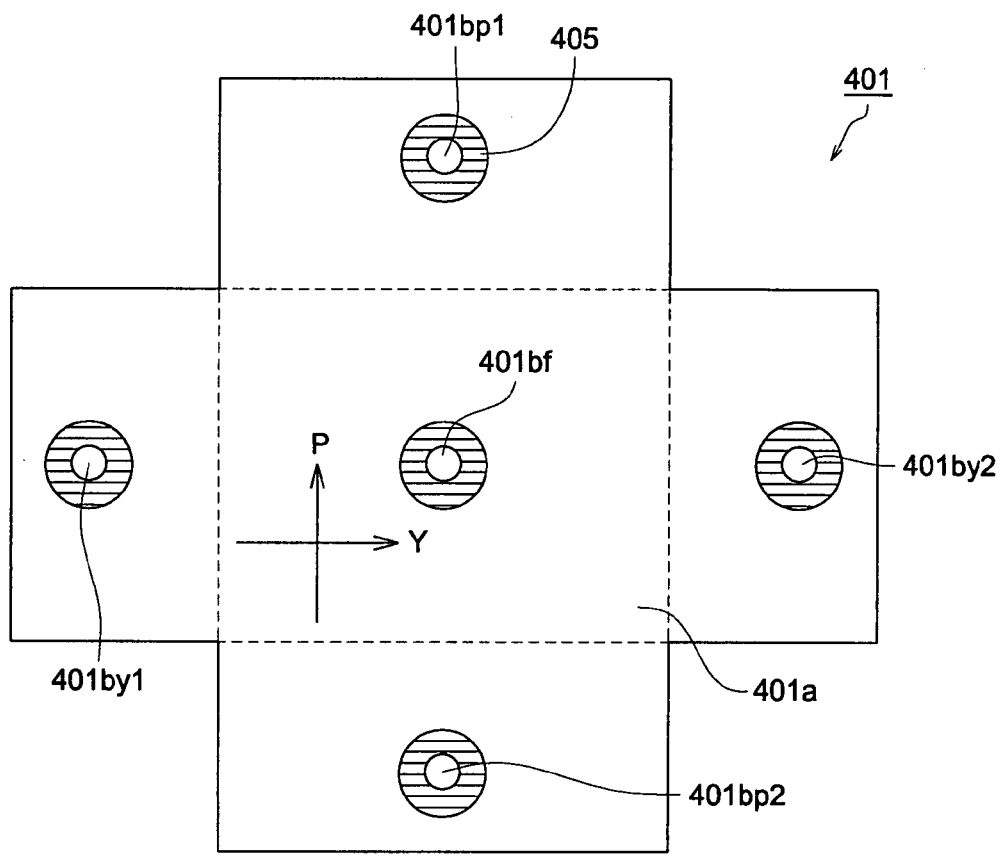

In FIG. 13(a), image pickup device chip 162b of image pickup device 162, which is the driven body of the present invention, is arranged in the vicinity of an image forming position on optical axis 200 of image pickup optical system 211 composed of lenses 211a and 211b, and the image pickup device chip 162b is mounted in image pickup device package 162a. The image pickup device package 162a is arranged in holding section 332a of the moving section 332, and polymer actuators 401 are arranged between the image pickup device package 162a and the holding section 332a.

The polymer actuators 401 have flat portion 401a and a plurality of projection-shaped displacement portions 401b, and the displacement portions 401b are arranged to come in contact with side surfaces and a bottom surface of the image pickup device package 162a. Let it be assumed that 401by1 and 401by2 represent displacement portions of polymer actuators 401 facing respectively the shorter sides of the image pickup device package 162a, 401bp1 and 401bp2 represent displacement portions of polymer actuators 401 facing respectively the longer sides of the image pickup device package 162a, and 401bf represents displacement portion of polymer actuators 401 facing a bottom surface of the image pickup device package 162a. In this case, the line which goes through displacement portions 401by1 and 401by2 and the line which goes through displacement portions 401bp1 and 401by2 intersect orthogonally with each other. And displacement portion 401bf is provided in the direction perpendicular to the plane including the abovementioned two lines.

The flat portion 401a of polymer actuators 401 is interposed between regulating member 332b fixed on holding section 332a and the holding section 332a, to be regulated so that the flat portion 401a may not be extended. The side closer to the image pickup optical system 211 on the image pickup device package 162a is biased in the −F direction of optical axis direction (hereinafter referred to as F direction) by bias spring 332c, and the image pickup device package 162a is in a form that it is interposed between the bias spring 332c and the displacement portion 401bf of polymer actuator 401.

In FIG. 13(b), the polymer actuators 401 are formed integrally by, for example, injection molding, rectangular and sheet-shaped flat portion 401a is in a form where five surfaces are connected, and projection-shaped displacement portions 401b are arranged in the vicinity of the center of each flat portion. The flat portion 401a is folded on the portions shown by dotted lines on the drawing to be inserted to be guided by inner surfaces of the holding section 332a. The shape is not limited to that shown here, and it may take any shape that matches the space for insertion. Electrode 405 shown in FIG. 2 is provided as a partial electrode on the entire surface of displacement portion 401b excluding a peak portion that comes in contact with image pickup device package 162a, on the upper side on the drawing, for example, and it is provided on the entire surface, on the rear side on the drawing. When the integrally formed polymer actuators 401 are interposed in fixing section 331a, and image pickup device package 162a is further assembled therein as described above, the top portions of each of the displacement portions come into contact with each surface of the package with a light force so that they support the package in a state of no voltage impressed.

Figure 14:
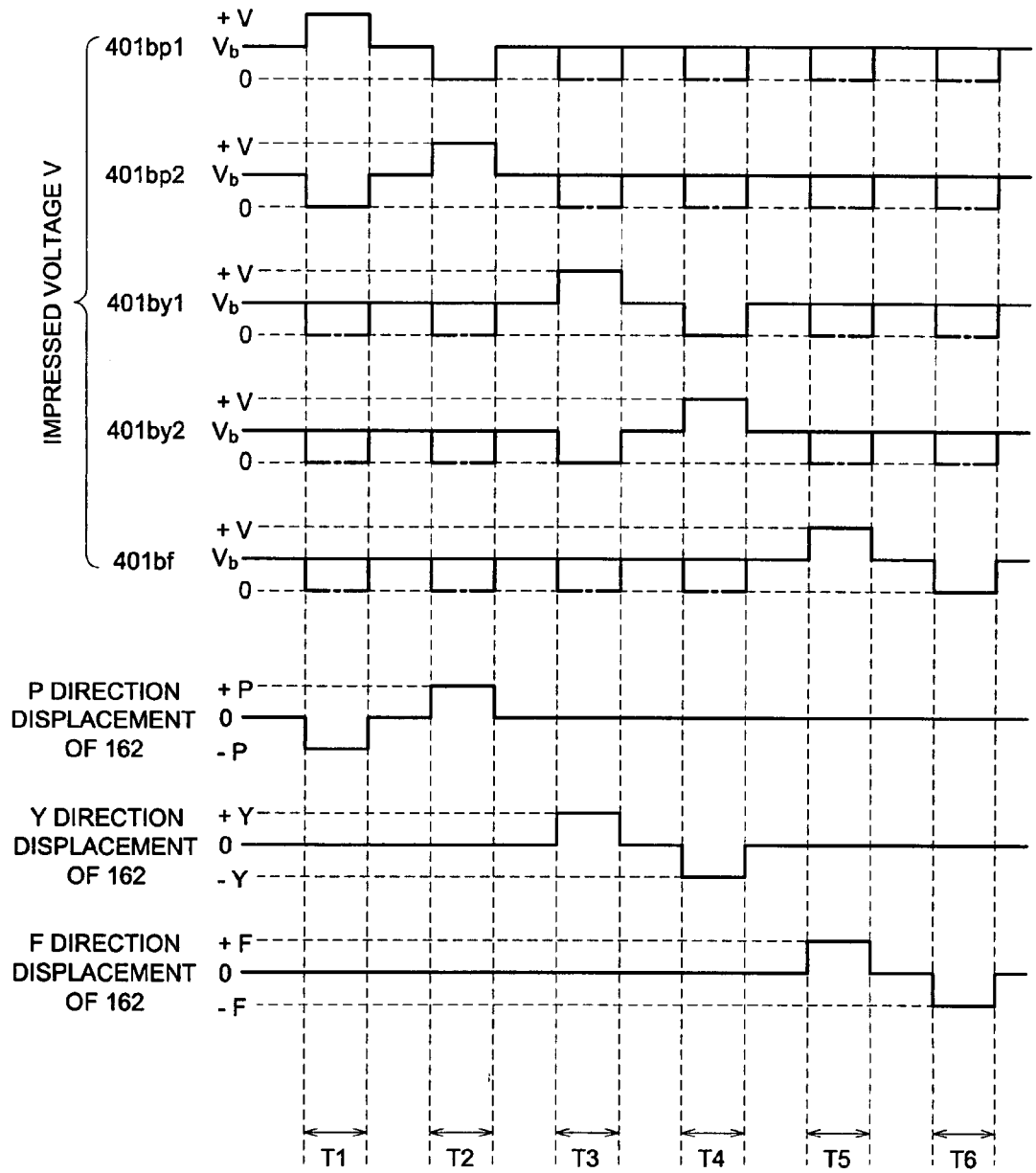
FIG. 14 is a timing chart showing relationship between a voltage impressed on a polymer actuator and a displacement of an image pickup device in the first embodiment of a moving section.

FIG. 14 is a timing chart showing relationship between voltage V to be impressed on five displacement portions 401bp1, 401bp2, 401by2, 401by2 and 401bf explained in FIGS. 13(a) and 13(b) and P direction displacement, Y direction displacement and F direction displacement of image pickup device 162.

When driving image pickup device package 162a, bias voltages Vb are impressed each of the displacement portions in an initial state. In FIG. 14, when a voltage of +V is impressed on displacement portion 401bp1 at timing T1 and the bias voltage on displacement portion 401bp2 is removed, the displacement portion 401bp1 extends and the displacement portion 401bp2 returns to the original length, and image pickup device package 162a of the image pickup device 162 is pressed in the −P direction as a whole, and the image pickup device 162 is displaced in the −P direction.

In the same way, when a the bias voltage Vb on displacement portion 401bp1 is removed, and voltage of +V is impressed on displacement portion 401bp2 at timing T2, the displacement portion 401bp2 extends and the displacement portion 401bp1 returns to the original length, and image pickup device package 162a of the image pickup device 162 is pressed in the +P direction, and the image pickup device 162 is displaced in the +P direction.

When a voltage of +V is impressed on displacement portion 401by1, and bias voltage Vb on displacement portion 401by2 is removed at timing T2, the displacement portion 401by1 extends and the displacement portion 401by2 shrinks, and image pickup device package 162a of the image pickup device 162 is pressed in the +Y direction, and the image pickup device 162 is displaced in the +Y direction.

In the same way, when the bias voltage Vb on displacement portion 401by1 is removed, and voltage of +V is impressed on displacement portion 401by2 at timing T4, the displacement portion 401by2 extends and the displacement portion 401by1 returns to the original length, and image pickup device package 162a of the image pickup device 162 is pressed in the −Y direction, and the image pickup device 162 is displaced in the −Y direction.

If a voltage at timing T1 and a voltage at timing T3 are impressed simultaneously, image pickup device package 162a is pressed in −P/+Y direction and the image pickup device 162 is displaced in the −P/+Y direction. In the same way, if a voltage at timing T1 and a voltage at timing T4 are impressed simultaneously, the image pickup device 162 is displaced in the −P/−Y direction, if a voltage at timing T2 and a voltage at timing T3 are impressed simultaneously, the image pickup device 162 is displaced in the +P/+Y direction, and if a voltage at timing T2 and a voltage at timing T4 are impressed simultaneously, the image pickup device 162 is displaced in the +P/−Y direction.

When a voltage of +V is impressed on displacement portion 401bf at timing T5, the displacement portion 401bf extends, image pickup device package 162a of the image pickup device 162 is pressed in the +F direction, and the image pickup device 162 is displaced in the +F direction overcoming bias force of bias spring 332c. Equally, when a bias voltage Vb on displacement portion 401bf is removed at timing T6, the displacement portion 401by1 returns to the original length, image pickup device package 162a of the image pickup device 162 is pressed in the −F direction by bias spring 332c, and the image pickup device 162 is displaced in the −F direction. Though the movement in the −F direction is carried out by bias spring 332c in this case, movement in the −F direction can also be carried out by using polymer actuator 401, by providing displacement portion 401b of polymer actuator 401, holding section 332a and regulating member 332b also on the upper part of image pickup device package 162a.

When a voltage is impressed on any displacement portion for driving the image pickup device 162 at each timing, displacement portions on which a bias voltage is impressed (for example, displacement portions 401bp1, 401bp2 and 401bf at timing T3 and T4) serve as frictional loads against the movement direction for the image pickup device package 162a. Therefore, it is preferable to reduce frictional loads through causing the displacement portion, that is causing frictional loads, to return to the original length by removing the bias voltages, in synchronization with the moment when a voltage is impressed on any displacement portion, as shown with one-dot chain lines in FIG. 14. Further, a minus voltage may be impressed to discharge the electric charge on the electrodes rapidly when causing the displacement portion to return to the original length.

As shown above, in the first embodiment of the present moving section, polymer actuators 401 have displacement portions capable of being formed integrally in three directions crossing at right angles each other including the optical axis direction and two directions intersecting at right angles on the plane perpendicular to the optical axis, and the polymer actuators 401 can be arranged in a narrow gap between image pickup device 162 and holding section 332a of moving section 332, to show the space efficiency which is extremely excellent, and driving for that is as simple as impressing a voltage only, and it can be controlled easily.

Next, the second embodiment of the moving section 332 employing the polymer actuator 401 will be explained as follows, referring to FIGS. 15(a) and 15(b). Each of FIGS. 15(a) and 15(b) is a schematic diagram showing the structure of the second embodiment of the moving section 332, and FIG. 15(a) is a sectional view on the plane that is in parallel with optical axis 200 of the second embodiment of the moving section 332, while, FIG. 15(b) is a development view showing a form of the polymer actuators 401.

Figure 15:
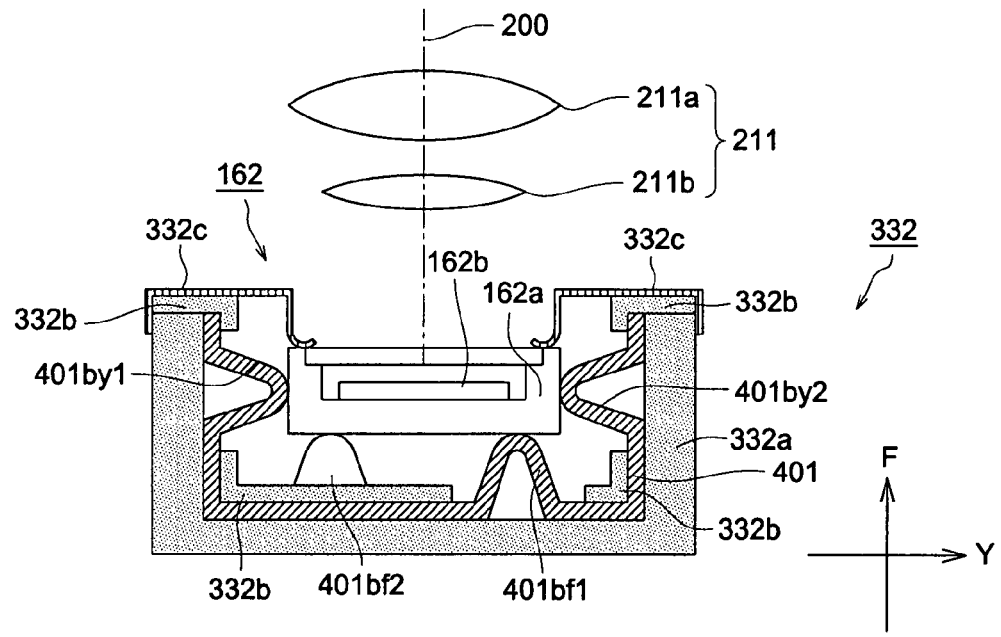
FIGS. 15(a) and 15(b) are schematic diagrams for illustrating the second embodiment of a moving section.
Figure 15:
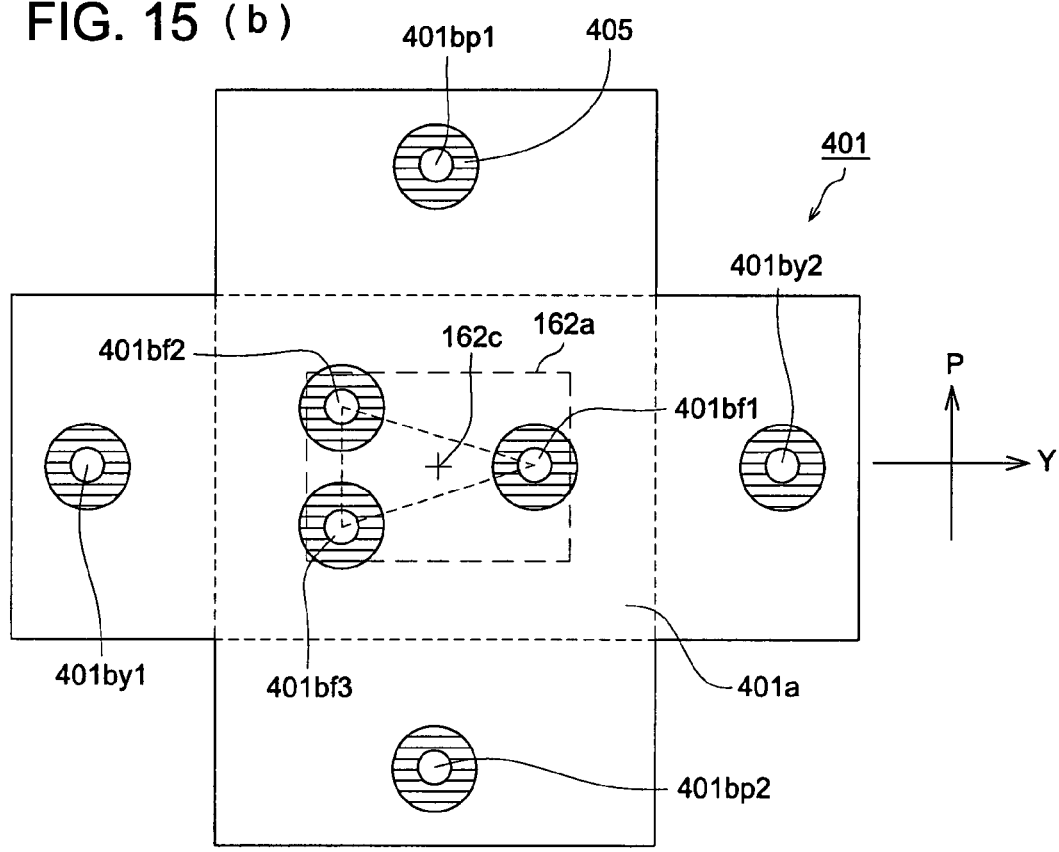

In the second embodiment of the present moving section, three displacement portions 401bf1, 401bf2 and 401bf3 are formed respectively on points of three vertexes of an isosceles triangle surrounding the center of gravity 162c of image pickup device package 162a, which is the driven body of the present invention, as shown in FIG. 15(b). Other structures and operations are the same as those shown in FIGS. 13(a) and 13(b) and FIG. 14.

In FIGS. 15(a) and 15(b), displacement portions 401bf1, 401bf2 and 401bf3 of the polymer actuators 401 are in contact with positions surrounding the center of gravity 162c of image pickup device package 162a, and these displacement portions sandwich the image pickup device package 162a together with bias springs 332c to move it in the F direction.

In the second embodiment of the present moving section, three displacement portions 401bf1, 401bf2 and 401bf3 apply force to the image pickup device package 162a through three points, as shown above. Therefore, even when frictional loads by displacement portions 401bp1, 401bp2, 401by1 and 401by2 fluctuate in terms of frictional loads in the case of moving the image pickup device package 162a in the F direction, the force can be applied to be in parallel with the optical axis and the force can be applied more stably to the image pickup device package 162a, compared with a method wherein the force is applied to center of gravity 162c of the image pickup device package 162a through one point, in the first embodiment of the present moving section shown in FIGS. 13(a) and 13(b).

Further, by using three displacement portions 401bf1, 401bf2 and 401bf3, each displacement portion can be small, and responsiveness in driving is improved, thus, image pickup device 162 can be moved at higher speed.

Further, by controlling, in detail, a voltage to be impressed on three displacement portions 401bf1, 401bf2 and 401bf3, it is possible to create phenomenal effects such as tilt-photographing, by correcting an inclination of an image pickup surface of image pickup device 162 for optical axis 200 and by tilting an image surface by giving an inclination inversely.

Figure 16:
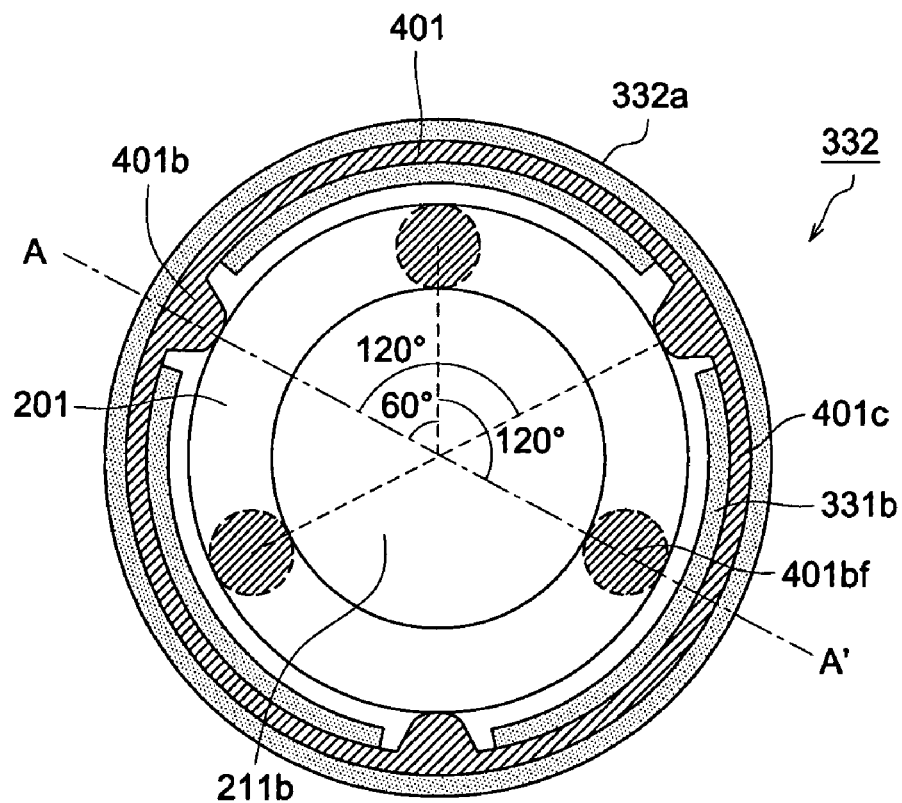
FIGS. 16(a) and 16(b) are schematic diagrams for illustrating the third embodiment of a moving section.
Figure 16:
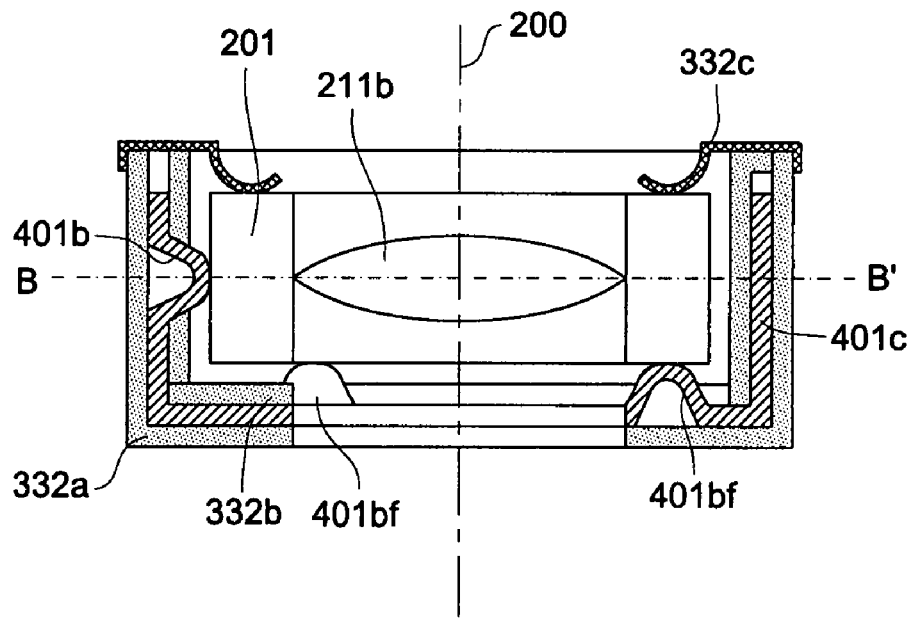

Next, the third embodiment of the moving section 332 employing the polymer actuator 401 will be explained as follows, referring to FIGS. 16(a) and 16(b). Each of FIGS. 16(a) and 16(b) is a schematic diagram for illustrating the third embodiment of the moving section 332, and FIG. 16(a) is a sectional view taken on line B-B' in FIG. 16(b) for the third embodiment of the moving section 332, while, FIG. 16(b) is a sectional view on A-A' in FIG. 16(a). In the present third embodiment, the moving section 332 conducts image shake correction and AF operations by moving lens 211b, which is the driven body of the present invention, that constitutes image pickup optical system 211. Namely, in the third embodiment of the moving section, moving section 332 is arranged on lens 221b, which is different from the structure shown in FIG. 12.

In FIGS. 16(a) and 16(b), lens 211b is mounted on an inner side of lens barrel 201, and the lens barrel 201 is arranged inside holding section 332a that has a glass-shape whose bottom surface has an opening at its center, and polymer actuators 401 are arranged between lens barrel 211 and holding section 332a.

The polymer actuators 401 also have a glass-shape whose bottom surface has an opening at its center in the same way as in holding section 332a, and an outer circumference of a side face of the glass has a cylinder-shape that is in contact with an inner side of holding section 332a, while, on the inner circumferential surface of the glass, there are provided three projection-shaped displacement portions 401b at an interval of 120°. The outer side of the bottom face side of the glass is in a shape of a ring that is in contact with the inside of holding section 332a, and on the inside of the glass, there are arranged three displacement portions 401bf which come in contact with an end surface of the lens barrel at 120° intervals, which are formed integrally. In the present example, displacement portion 401b on the side surface and displacement portion 401bf on the bottom surface are arranged respectively at positions each being deviated by 60° from the optical axis.

Thin portion 401c other than six displacement portions of the polymer actuators 401 is interposed between regulating member 332b fixed on holding section 332a and the holding section 332a so that the thin portion may not be extended even when a voltage is impressed. An end surface of lens barrel 201 positioned on the side of the lens barrel that is not in contact with displacement portion 401bf is biased in the optical axis direction by bias spring 332c, and the lens barrel 201 is in a state to be interposed between the bias spring 332c and displacement portions 401bf of the polymer actuators 401.

An electrode construction of the polymer actuators 401 in the third embodiment of the present moving section may be the same as the electrode construction shown in FIGS. 13(b) and 15(b). Further, a driving method for the F direction is the same as that for three displacement portions 401bf1, 401bf2 and 401bf3 in a triangular arrangement shown in FIG. 15(b), and its effect is also the same.

Further, for the P direction and the Y direction, lens 211b can be moved freely in the plane perpendicular to the optical axis by controlling properly a size of voltage V to be impressed on three displacement portions 401b, because these three displacement portions 401b are located respectively at three vertex positions of an equilateral triangle, and are arranged so that the force of each displacement portion may act along the optical axis. Though the lens 211b that constitutes image pickup optical system 211 is moved in the present example, the total image pickup optical system 211 may also be moved. Since the generated force of the polymer actuator is great, an object that is as heavy as the total image pickup optical system 211 can be moved.

As shown above, in the third embodiment of the moving section, it is possible to form a complicated shape such as one like that in the present example wherein a projection is provided inside a glass having an opening at the center of its bottom surface that is unimaginable in an ordinary actuator, because a shape of the polymer actuators 401 can be formed freely through injection molding, and the degree of freedom for shape is extremely high. Further, polymer actuators 401 can be arranged in a narrow gap between lens 211b and holding section 332a of moving section 332, to show the space efficiency which is extremely excellent, and driving for that is as simple as controlling a size of a voltage to be impressed, which is very simple and control is easy.

Next, the fourth and the fifth embodiments of the moving section 332 employing polymer actuator 401 will be explained as follows, referring to FIGS. 17(a) and 17(b). Each of FIGS. 17(a) and 17(b) is a schematic diagram for illustrating the fourth and the fifth embodiments of the moving section 332, and FIG. 17(a) is a sectional view for illustrating the fourth embodiment, while, FIG. 17(b) is a sectional view for illustrating the fifth embodiment.

Since the displacement portions on which a voltage is not impressed serve as frictional loads against the movement direction for the image pickup device package 162a, in the first through third embodiments of the moving section, as mentioned in the explanation of FIGS. 14a and 14b, there was given an explanation of a method to reduce frictional loads by removing the bias voltage as shown with one-dot chain lines in FIG. 14. In the fourth and the fifth embodiments, there will be given an explanation of a method to eliminate frictional loads without impressing negative voltage.

Figure 17A:
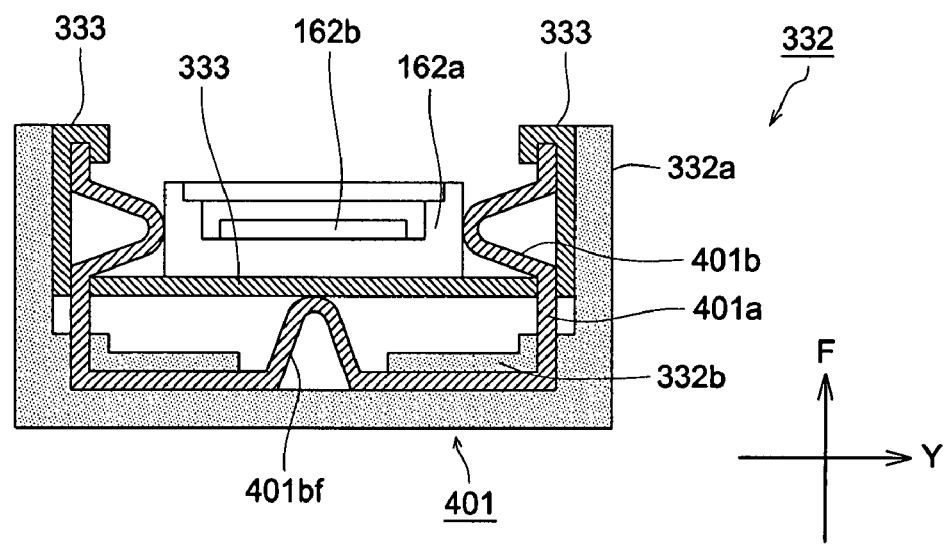
FIGS. 17(a) and 17(b) are schematic diagrams for illustrating the fourth and the fifth embodiments of a moving section.
Figure 17B:
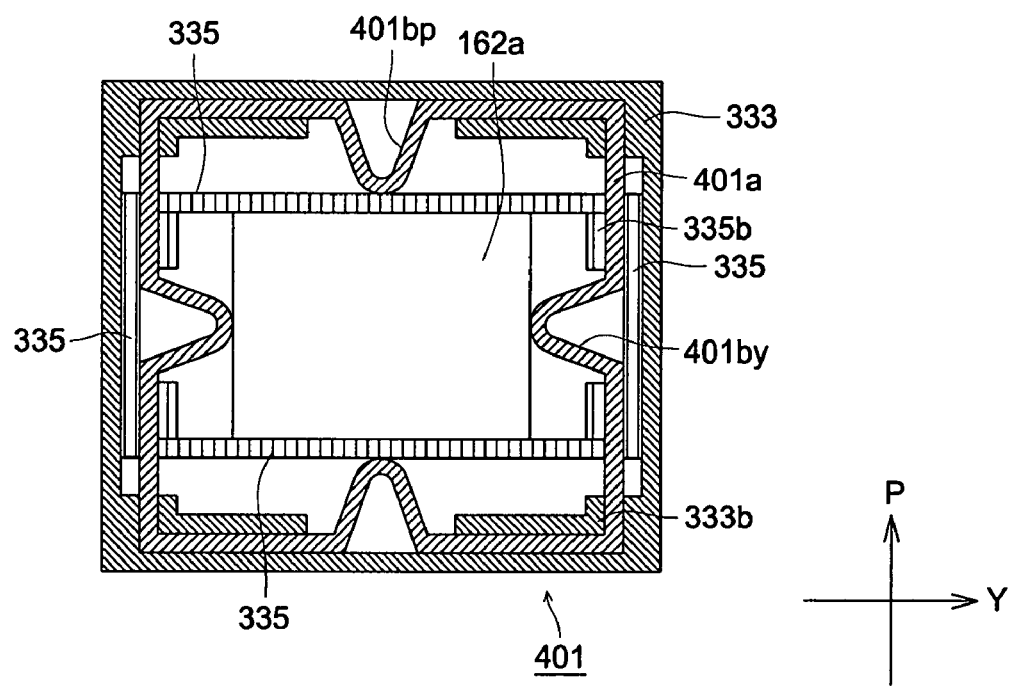

In FIG. 17(a), image pickup device package 162a is arranged so that its bottom surface is in contact with a bottom portion of frame 333 that is in a shape of a glass, while, polymer actuators 401 are arranged between a side face of the image pickup device package 162a and a side face of the frame 333, in the same way as in the first embodiment of the moving section in FIGS. 13(a) and 13(b), and displacement portion 401b of the polymer actuator 401 is in contact with a side face of the image pickup device package 162a.

On the other hand, the frame 333 is inserted into holding section 332a to be in contact with an inner wall of the holding section 332a, and displacement portion 401bf of the polymer actuator 401 is in contact with a bottom portion of the frame 333. The displacement portion 401b and the displacement portion 401f of the polymer actuators 401 are formed integrally to be in the form identical to that shown in FIG. 13(b).

When assembling the moving section 332, polymer actuators 401 are folded at broken lines shown in FIG. 13(b) to be inserted into holding section 332a, and regulating member 332b is placed on the polymer actuators 401 to be fixed on holding section 332a. On the frame 333, there is provided a hole through which the displacement portion 401b of the polymer actuator 401 passes, and the frame 333 is inserted into holding section 332a under the condition that the displacement portion 401b is in the hole. Finally, image pickup device package 162a is inserted into the frame 333, and the assembly is completed.

The image pickup device package 162a is moved by displacement portion 401b of the polymer actuator 401 both in the P direction and the Y direction in the frame 333. The frame 333 is moved by displacement portion 401bf of the polymer actuator 401 in the F direction inside holding section 332a, and image pickup device package 162a is also moved in the F direction together with the frame 333. The polymer actuators 401 are made of flexible material such as rubber, and in the case of its movement in the Y direction, flat portion 401a of the polymer actuators 401 extend and shrink, which prevents obstruction for the movement.

In the fourth embodiment of the moving section of the invention, the aforesaid structure makes it possible to eliminate frictional loads caused by displacement portion 401b in the P direction and the Y direction in the case of movement of the image pickup device package 162a in the F direction, without removing a bias voltage, and to eliminate frictional loads caused by displacement portion 401bf in the F direction in the case of movement of the image pickup device package 162a in the P direction and the Y direction, as stated above.

In FIG. 17(b), there will be explained a method to eliminate frictional loads in the case of movement in the P direction and the Y direction, by providing further the second frame 335 in the frame 333 in FIG. 17(a).

In FIG. 17(b), the image pickup device package 162a is arranged inside the second frame 335, and its longer side surface is in contact with an inner wall of the second frame 335, while, the polymer actuators 401 are arranged between the shorter side surface and the inner wall of the second frame 335, and displacement portion 401by in the Y direction of the polymer actuator 401 is in contact with the shorter side surface of the image pickup device package 162a. Flat portion 401a in the Y direction of the polymer actuators 401 is interposed between the second frame 335 and regulating member 335b of the second frame.

On the other hand, the second frame 335 is arranged inside the frame 333, and displacement portion 401bp in the P direction of the polymer actuator 401 is in contact with a side face corresponding to the longer side of the image pickup device package 162a. Displacement portion 401by and displacement portion 401bp of the polymer actuators 401 are formed integrally. Flat portion 401a in the P direction of the polymer actuators 401 is interposed between the frame 333 and regulating member 333b of the frame.

The image pickup device package 162a is moved in the Y direction by displacement portion 401by in the Y direction of polymer actuator 401 inside the second frame 335. The second frame 335 is moved in the P direction by displacement portion 401bp in the P direction of the polymer actuator 401 inside the frame 333, and image pickup device package 162a is also moved in the P direction together with the second frame 335.

In the fifth embodiment of the moving section of the invention, the aforesaid structure makes it possible to eliminate frictional loads caused by displacement portion 401by in the Y direction in the case of movement of the image pickup device package 162a in the P direction, without removing a bias voltage, and to eliminate frictional loads caused by displacement portion 401bp in the P direction in the case of movement of the image pickup device package 162a in the Y direction, as stated above.

Figure 18:
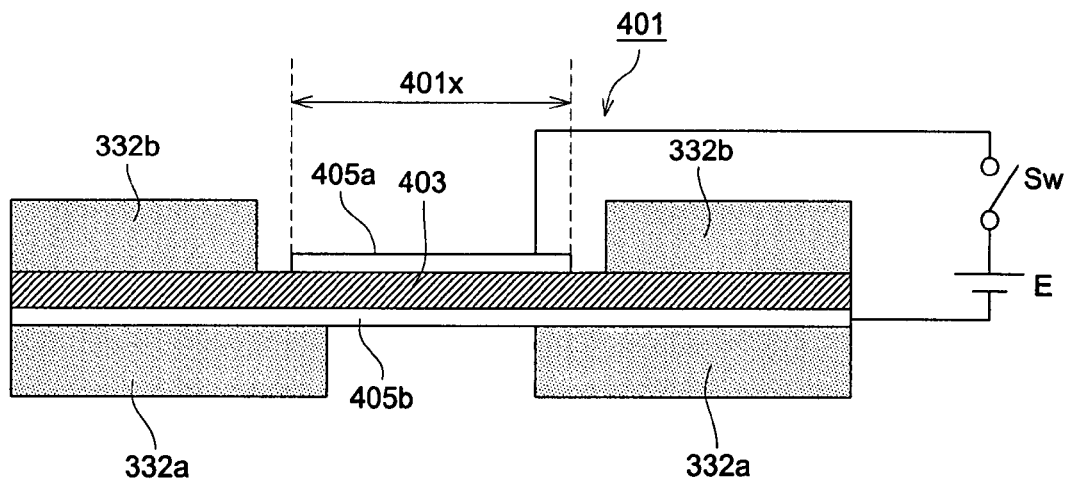
FIGS. 18(a) and 18(b) are schematic diagrams showing the second example of a polymer actuator.
Figure 18:
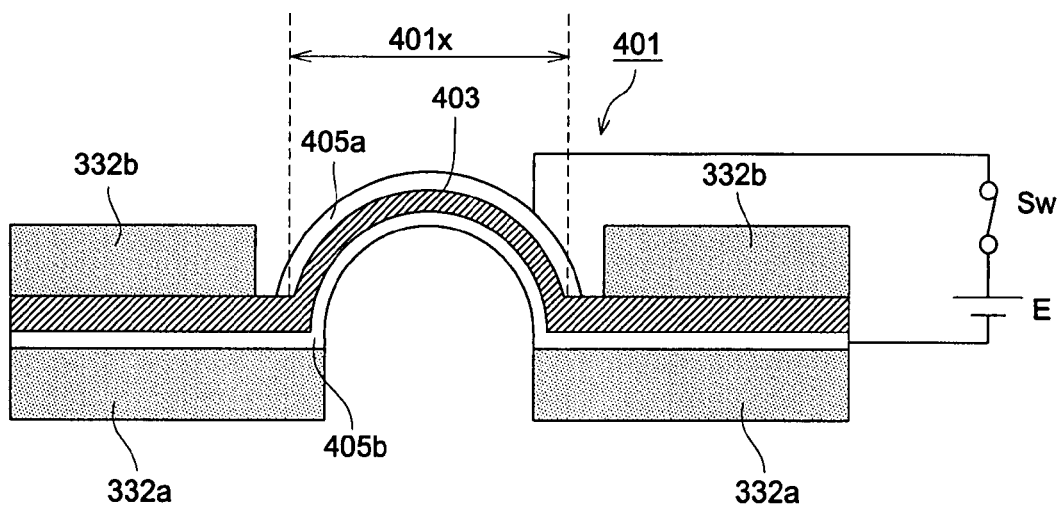
Figure 19:
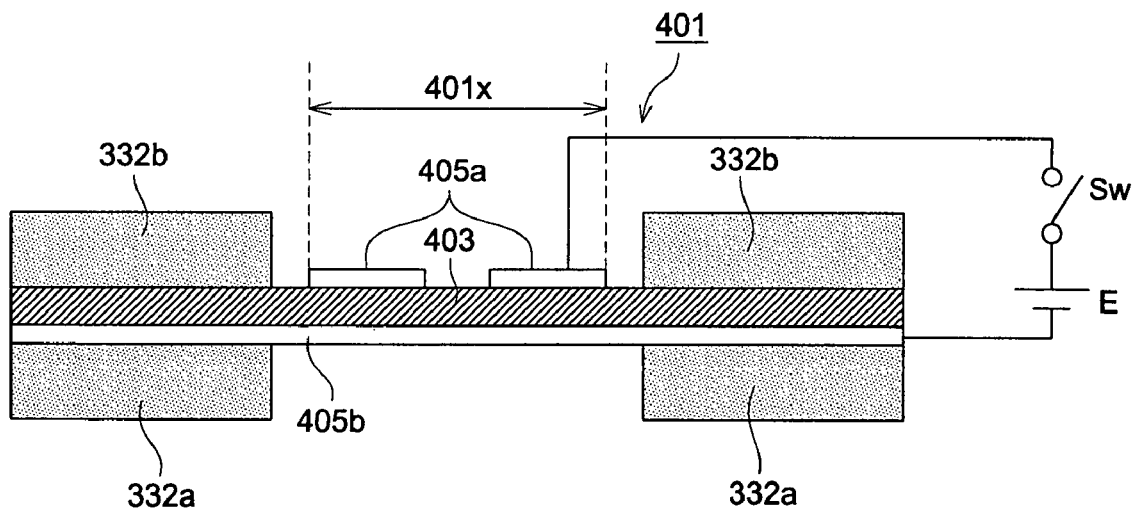
FIGS. 19(a) and 19(b) are schematic diagrams showing the third example of a polymer actuator.
Figure 19:
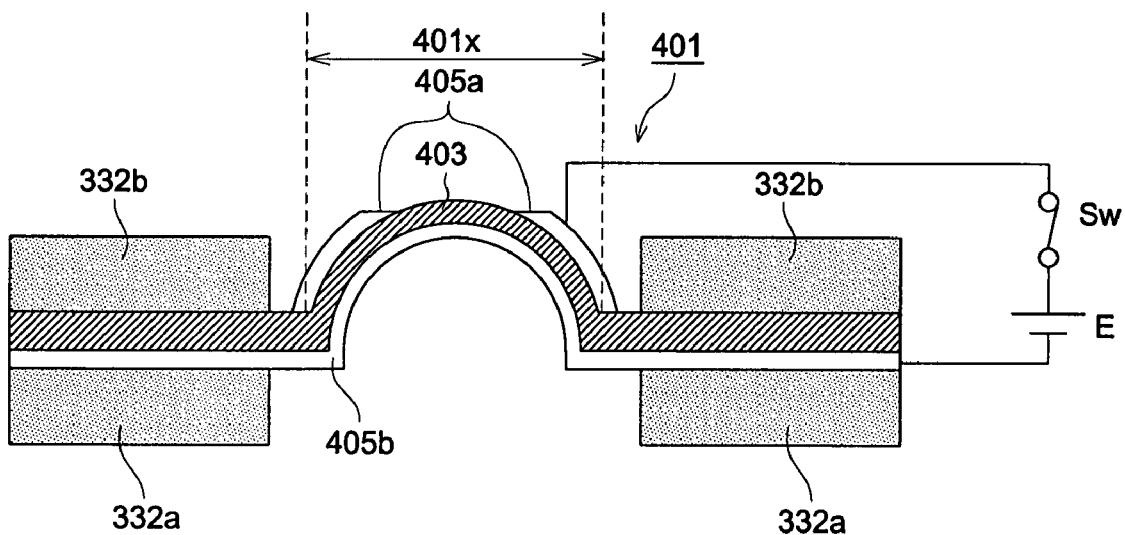
Figure 21:
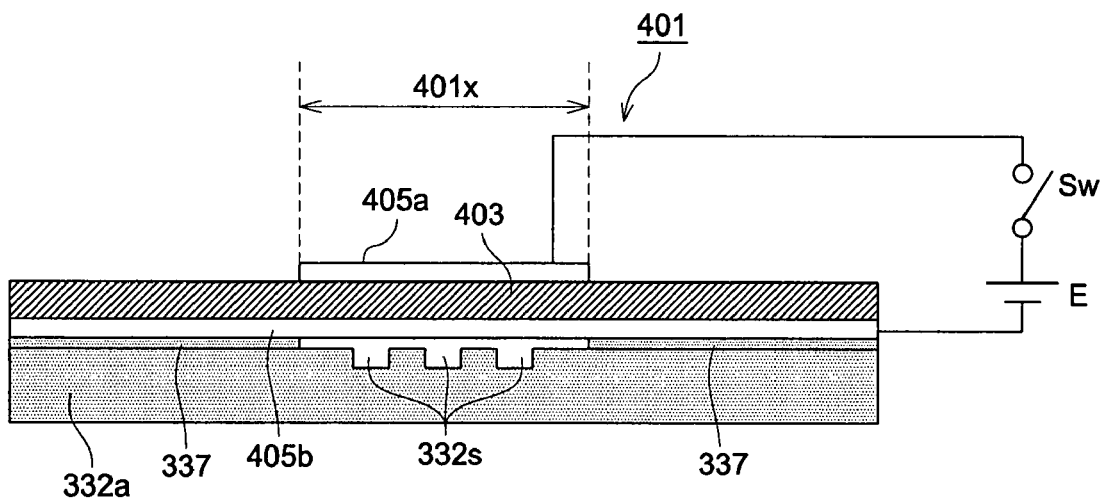
FIGS. 21(a) and 21(b) are schematic diagrams showing the fifth example of a polymer actuator.
Figure 21:
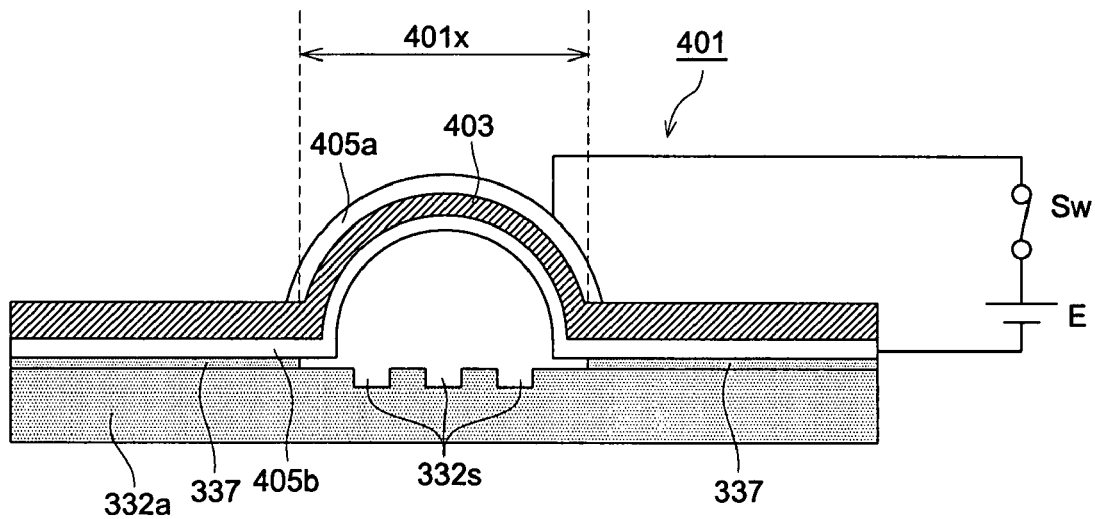

Next, another example of the structure of polymer actuator 401 used in the invention will be explained as follows, referring to FIGS. 18(a)-21(b). Each of FIGS. 18(a) and 18(b) is the second example of the polymer actuator 401, each of FIGS. 19(a) and 19(b) is the third example, each of FIGS. 20(a) and 20(b) is the fourth example, and each of FIGS. 21(a) and 21(b) is the fifth example.

In the first example of the invention mentioned above, for example as depicted in FIG. 13(b), polymer actuators 401 have flat portion 401a and projection-shaped displacement portion 401b, electrodes 405 are provided on the entire surface of displacement portion 401b excluding a vertex portion that comes in contact with image pickup device package 162a on the upper face side of the drawing, and provided on the entire surface on the rear face side, and when voltage is impressed between electrodes, the displacement portion 401b extends and shrinks to operate as an actuator.

On the other hand, in the second and fifth examples of the structure of polymer actuators 401 to be explained here, the polymer actuators 401 are in a flat shape, and it has not projection-shaped displacement portion 401b. Therefore, electrode 405 can be formed simply through printing, and it is easy to incorporate the polymer actuator 401s in moving section 332.

In FIG. 18(a), polymer actuator 401 is composed of planar expanding and contracting section 403 made of dielectric high-molecular material and of top surface electrode 405a and bottom surface electrode 405b both made of conductive high-molecular material. In this example, the top surface electrode 405a is made to be a partial electrode, and the bottom surface electrode 405b is made to be an overall electrode. An area interposed between the top surface electrode 405a and the bottom surface electrode 405b is action portion 401x that acts as an actuator. The action portion 401x functions as a displacement portion in the invention.

On the polymer actuator 401, a portion other than the action portion 401x is interposed between holding section 332a and regulating member 332b, for stabilizing deformation by enhancing rigidity. It is preferable that the holding section 332a is extended to be closer to the action portion 401x than the regulating member 332b is, to the extent wherein the holding section 332a almost touches a range of the action portion 401x, or a part of the holding section 332a intrudes into the action portion 401x. In this case, the holding section 332a and the regulating member 332b function as a fixing portion in the invention.

In FIG. 18(b), when switch Sw is turned on and voltage V is impressed between the top surface electrode 405a and the bottom surface electrode 405b, the action portion 401x is compressed by electrostatic force to extend in the lateral direction, and it cannot extend to the bottom surface electrode 405b side because of an obstacle of the holding section 332a, resulting in deformation in a shape projecting to the top surface electrode 405a side as shown in the drawing. Since electrode 405 is also made of flexible high-molecular material such as rubber like one for the expanding and contracting section 403, it is deformed to be convex together with the expanding and contracting section 403.

Though the top surface electrode 405a in each of the examples in FIGS. 18(a) and 18(b) is an electrode which is uniform on the total action portion 401x, the top surface electrode 405a in each of FIGS. 19(a) and 19(b) is provided as a partial electrode wherein a vertex portion coming in contact with an object to be driven is eliminated, in the same way as in electrode 405 shown in each of FIG. 13(b). Other structures are the same basically as those in FIGS. 18(a) and 18(b). However, it is not indispensable to extend the holding section 332a to be closer to the action portion 401x than the regulating member 332b is.

In FIG. 19(b), when switch Sw is turned on and voltage V is impressed between the top surface electrode 405a and the bottom surface electrode 405b, the action portion 401x is compressed by electrostatic force to extend in the lateral direction, and it is deformed to be in a shape projecting toward the top surface electrode 405a side as shown in the drawing, because it is easy to extend in the direction in which the vertex portion of the top surface electrode 405a is eliminated. Since electrode 405 is also made of flexible high-molecular material such as rubber like one for the expanding and contracting section 403, it is deformed to be in a convex shape together with the expanding and contracting section 403.

By eliminating an electrode on the vertex portion that comes in contact with an object to be driven in advance, it is possible to prevent a problem such as operation failures which are caused when the electrode on the vertex portion touches the object to be driven to wear the electrode away, and friction is increased by the worn electrode, and operations are stabilized. Further, the direction of deformation can also be determined.

In FIG. 20(a), the total back side of the polymer actuator 401 other than the back side of the action portion 401x are spread over the holding section 332a with adhesive agents 337. This method is also capable of enhancing rigidity and stabilizing the deformation, in the same way as in the method for interposing between holding section 332a and regulating member 332b shown in FIGS. 18(a) and 18(b). In this case, the holding section 332a and adhesive agents 337 function as a fixing section.

Since the layer of the adhesive agents 337 is extremely thin, the polymer actuator 401 and the holding section 332a are substantially in close contact each other. Under this condition, even when voltage V is impressed on the top surface electrode 405a and bottom surface electrode 405b, the action portion 401x cannot be deformed to be in a convex shape. Therefore, in the examples in FIG. 20(a) and FIG. 20(b), opening 407 is provided in the action portion 401x.

In FIG. 20(b), when switch Sw is turned on and voltage V is impressed between the top surface electrode 405a and the bottom surface electrode 405b, the action portion 401x is compressed by electrostatic force to extend in the lateral direction, and air enters a space between the action portion 401x and holding section 332a through the opening 407, thus, the top surface electrode and the bottom surface electrode are deformed to be convex toward the top surface electrode side.

In FIG. 21(a), the total back side of the polymer actuator 401 other than the back side of the action portion 401x is spread over the holding section 332a with adhesive agents 337, in the same way as in FIGS. 20(a) and 20(b). Slit-shaped grooves 332s are formed on the adverse side of at least a portion of the holding section 332a facing the action portion 401x of polymer actuator 401.

In FIG. 21(b), when switch Sw is turned on and voltage V is impressed between the top surface electrode 405a and the bottom surface electrode 405b, the action portion 401x is compressed by electrostatic force to extend in the lateral direction, and air enters the space between the action portion 401x and holding section 332a from the holding section 332a side through the grooves 332s, thus, the top surface electrode and the bottom surface electrode are deformed to be convex toward the top surface electrode side, as shown in the drawing.

In examples shown in FIGS. 20(a) and 20(b) and in FIGS. 21(a) and 21(b), when enhancing rigidity of polymer actuator 401 by adhesion and by stabilizing deformation, it is possible to make deformation in a convex shape of action portion 401x to be easy, by providing opening section 407 and grooves 332s for feeding in air to the space between action portion 401x and holding section 332a. A method to provide opening section 407 and grooves 332s is effective when holding sections 332a, for example, are formed on the entire back side of the polymer actuator 401, even in the case of interposing between holding section 332a and regulating member 332b shown in FIGS. 18(a) and 18(b) and FIGS. 19(a) and 19(b).

In the second through fifth examples of the polymer actuator 401 shown in FIGS. 18(a) through 21(b), electrode 405 can be formed simply through printing, because the polymer actuator 401 can be composed to be in a flat shape, and when incorporating the polymer actuators 401 in moving section 332, a flat plate has only to be bent to be inserted, which is extremely easy.

Further, it is possible to prepare simply an element that determines directionality of the deformation by regulating a direction of the deformation by holding section 332a or by eliminating the vertex portion of the top surface electrode 405a partially to make a portion that is easily deformed.

Though the number of action portions 401x is one in the example shown above, it is naturally possible to form plural action portions integrally.

When incorporating polymer actuators 401 in the second through fifth examples in the first through fifth embodiments of the moving section of the invention, the polymer actuator 401 is arranged so that action portion 401x and displacement portion 401b may agree with each other positionally, and an object to be driven such as image pickup device 162 or lens barrel 201 and the polymer actuators 401 are arranged so that both of them may contact closely to each other.

As stated above, in the embodiment of the present moving section in which a polymer actuator is provided, a plurality of functions can be realized by a single body by moving objects to be driven such as an image pickup device, a lens, an image pickup optical system and a lens barrel unit in plural different directions by the use of the actuator, and an actuator having excellent assembly simplicity can be realized, thus, a small-sized and highly efficient drive apparatus, an image pickup unit and an image pickup apparatus can be provided.

Incidentally, with respect to the image pickup unit of the invention, and to detailed structures of each structure constituting the image pickup unit and the image pickup apparatus as well as to detailed operations, they can be modified within a range that does not depart from the spirit and scope of the invention.

What is claimed is:

1. A drive apparatus, comprising:
   a driven body; and
   an actuator assembly for moving the driven body, the actuator assembly including:
   at least two polymer actuators, each of the polymer actuators having:
   a polymer layer; and
   a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer;
   wherein acting directions of two of the polymer actuators cross approximately orthogonally.

2. The drive apparatus of claim 1, further comprising:
   a regulating member,
   wherein each polymer layer of the polymer actuators includes a displacement portion which comes into contact with the driven body, and a displacement of a portion of the polymer actuator other than the displacement portion is regulated by the regulating member.

3. The drive apparatus of claim 2, wherein a plurality of the displacement portions are integrally formed.

4. The drive apparatus of claim 2, wherein at least two of the polymer actuators are arranged in at least one of the directions in which the driven body is moved.

5. The drive apparatus of claim 1, comprising:
   a support member which is provided on a circumference of the actuator assembly and supports the polymer actuators.

6. The drive apparatus of claim 1, comprising:
   a polymer actuator which is provided in a direction perpendicular to a plane containing the approximately orthogonal two acting directions.

7. The drive apparatus of claim 6, wherein the displacement portions of the polymer actuators arranged in the three directions are integrally formed and come into contact with the driven body.

8. The drive apparatus of claim 1, wherein at least one of the polymer layers includes:
   a plurality of the displacement portions for moving the driven body in one direction in which the driven body is moved, the plurality of the displacement portions being arranged in positions surrounding a center of gravity of the driven body.

9. The drive apparatus of claim 1, further comprising:
   a fixing member,
   wherein each of the polymer layers includes an action portion which is sandwiched by the pair of electrodes, and the fixing member fixes a portion of the polymer layer other than the action portion;
   and which action portion deforms into a convex shape in response to an application of an electric field across the pair of electrodes,
   wherein the action portions are integrally formed.

10. The drive apparatus of claim 9, wherein the electrode has an opening on a portion which becomes a top portion and touches the driven body when the action portion deforms into the convex shape.

11. The drive apparatus of claim 9, wherein
   the action portion has an opening through which air passes through the action portion.

12. The drive apparatus of claim 9, wherein the fixing member includes a groove formed in a surface of the fixing member facing the action portion.

13. The drive apparatus of claim 6, comprising:
   an actuator control section which controls the polymer actuators,
   wherein the actuator control section controls the polymer actuators by putting a motion in a plane containing two approximately orthogonal acting directions and a motion in a direction perpendicular to the plane in synchronism each other.

14. An image pickup unit, comprising:
   an image pickup optical system which provides a subject image;
   an image pickup device for picking up the subject image provided by the image pickup optical system;
   an actuator assembly for driving the image pickup optical system, which is a driven body, in a plane perpendicular to an image pickup optical axis, the actuator assembly including:
   at least two polymer actuators, each of the polymer actuators having:
   a polymer layer; and
   a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer; and
   an image shake correction section,
   wherein the polymer actuators are arranged so that acting directions of the polymer actuators cross approximately orthogonally, and the image shake correction section corrects the subject image by controlling the polymer actuator to drive the driven body in a plane.

15. An image pickup unit, comprising:
   an image pickup optical system which provides a subject image;
   an image pickup device for picking up the subject image provided by the image pickup optical system;
   an actuator assembly for driving the image pickup device, which is a driven body, in a plane perpendicular to an image pickup optical axis, the actuator assembly including:
   at least two polymer actuators, each of the polymer actuators having:
   a polymer layer; and
   a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer; and
   an image shake correction section,
   wherein the polymer actuators are arranged so that acting directions of the polymer actuators cross approximately orthogonally, and the image shake correction section corrects the subject image by controlling the polymer actuator to drive the driven body in a plane.

16. An image pickup unit, comprising:
a lens barrel unit; the lens barrel unit including:
- an image pickup optical system which provides a subject image; and
- an image pickup device for picking up the subject image provided by the image pickup optical system, the image pickup optical system and the image pickup device being integrally arranged; and an actuator assembly, the actuator assembly including:
- at least two polymer actuators, each of the polymer actuators having:
  - a polymer layer which includes a plurality of displacement portions being in contact with the lens barrel unit for driving the lens barrel unit; and
  - a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer.

17. An image pickup unit, comprising:
an image pickup optical system which provides a subject image;
an image pickup device for picking up the subject image provided by the image pickup optical system,
an actuator assembly for driving the image pickup optical system, which is a driven body, the actuator assembly including:
- at least two polymer actuators, each of the polymer actuators having:
  - a polymer layer; and
  - a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer; and an image shake correction section,
wherein at least two of the polymer actuators are arranged in at least one of the directions in which the driven body is moved, and the image shake correction section corrects the subject image by controlling the polymer actuators to move the driven body.

18. An image pickup unit, comprising:
an image pickup optical system which provides a subject image;
an image pickup device for picking up the subject image provided by the image pickup optical system,
an actuator assembly for driving the image pickup device, which is a driven body, in a plane perpendicular to an image pickup optical axis, the actuator assembly including:
- at least two polymer actuators, each of the polymer actuators having:
  - a polymer layer; and
  - a pair of electrodes with one provided on each of opposite sides of the polymer layer, wherein when a voltage is applied between the pair of electrodes, attraction force is generated between the pair of electrodes, and the polymer layer sandwiched by the pair of electrodes is compressed to extend in a lateral direction of the polymer layer; and an image shake correction section,
wherein at least two of the polymer actuators are arranged in at least one of the directions in which the driven body is moved, and the image shake correction section corrects the subject image by controlling the polymer actuators to move or rotate the driven body.

19. An image pickup apparatus, comprising:
an image pickup unit of claim 14; and
an image shake detection section for detecting an image shake of the image pickup unit,
wherein the image shake correction section arranged in the image pickup unit controls a driving of the polymer actuators arranged in the image pickup unit based on a detection result of the image shake detection section.

20. An image pickup apparatus, comprising:
an image pickup unit of claim 15; and
an image shake detection section for detecting an image shake of the image pickup unit,
wherein the image shake correction section arranged in the image pickup unit controls a driving of the polymer actuators arranged in the image pickup unit based on a detection result of the image shake detection section.

21. The image pickup apparatus of claim 19, comprising:
a temperature detection section for detecting a temperature of the image pickup unit,
wherein the image shake correction section controls the driving of the polymer actuators based on a detection result of the temperature detection section.

22. The image pickup apparatus of claim 20, comprising:
a temperature detection section for detecting a temperature of the image pickup unit,
wherein the image shake correction section controls the driving of the polymer actuators based on a detection result of the temperature detection section.

23. An image pickup apparatus, comprising:
an image pickup unit; the image pickup unit including:
- an image pickup optical system for providing a subject image;
- an image pickup device for picking up the subject image provided by the image pickup optical system; and
- a drive apparatus of claim 6, a focus detection section for detecting a focus condition of the subject image provided by the image pickup optical system;
an autofocus section which conducts a focusing operation by driving the polymer actuator based on a detection result of the focus detection section;
an image shake detection section which detects an image shake of the image pickup apparatus; and
an image shake correction section which corrects the image shake by driving the polymer actuators based on a detection result of the image shake detection section.

* * * * *